(12) United States Patent
Murase et al.

(10) Patent No.: US 8,866,914 B2
(45) Date of Patent: Oct. 21, 2014

(54) PATTERN POSITION DETECTION METHOD, PATTERN POSITION DETECTION SYSTEM, AND IMAGE QUALITY ADJUSTMENT TECHNIQUE USING THE METHOD AND SYSTEM

(71) Applicant: IIX Inc., Tokyo (JP)

(72) Inventors: Hiroshi Murase, Tokyo (JP); Masayoshi Imoto, Tokyo (JP)

(73) Assignee: IIX Inc., Tokyo (JP)

( * ) Notice: Subject to any disclaimer, the term of this patent is extended or adjusted under 35 U.S.C. 154(b) by 0 days.

(21) Appl. No.: 13/845,354

(22) Filed: Mar. 18, 2013

(65) Prior Publication Data

US 2014/0232880 A1 Aug. 21, 2014

Related U.S. Application Data

(63) Continuation of application No. PCT/JP2013/053918, filed on Feb. 19, 2013.

(51) Int. Cl.
*H04N 17/00* (2006.01)
*H04N 17/02* (2006.01)

(52) U.S. Cl.
CPC .................................. *H04N 17/02* (2013.01)
USPC ........................... 348/189; 348/177; 348/184

(58) Field of Classification Search
CPC ..... H04N 1/60; H04N 1/6002; H04N 1/6003; H04N 5/235; H04N 17/00; H04N 17/02; H04N 17/002; H04N 17/004; H04N 9/77; H04N 9/3194; H04N 9/3182; G09G 3/006; G09G 2320/0233; G09G 2320/0693; G09G 5/02; G02G 1/1309; G06T 5/002
USPC ................... 348/177–180, 189, 190; 382/167; 345/87, 89
See application file for complete search history.

(56) References Cited

U.S. PATENT DOCUMENTS 7,822,269 B2 * 10/2010 Tsukada ........................ 382/167
8,184,923 B2 * 5/2012 Hayakawa et al. ........... 382/267
8,520,077 B2 * 8/2013 Nagamine et al. ............ 348/189

(Continued)

FOREIGN PATENT DOCUMENTS

CN 101276571 A 10/2008
EP 1696679 A 8/2006

(Continued)

OTHER PUBLICATIONS

Written Opinion of International Searching Authority of PCT/JP2013/053918 mailed Apr. 16, 2013.

*Primary Examiner* — Brian Yenke
(74) *Attorney, Agent, or Firm* — Novak Druce Connolly Bove + Quigg LLP

(57) ABSTRACT

Provided is a pattern position detection method that allows detecting positions of patterns used for alignment with high accuracy. According to the pattern position detection method of the present invention, patterns are displayed on a liquid crystal panel (2) and captured by a camera (3). A black image is displayed on the liquid crystal panel (2) and captured by the camera (3) using a shutter speed or an f-number used when capturing the patterns. Based on a difference between a captured image of the patterns and a captured image of the black image, positions of images of the patterns on an imaging surface of the camera (3) are detected.

7 Claims, 7 Drawing Sheets

(56) References Cited

U.S. PATENT DOCUMENTS

| | | | |
|---|---|---|---|
| 8,605,106 B2 * | 12/2013 | Wang | 345/589 |
| 8,644,554 B2 * | 2/2014 | Hao et al. | 382/103 |
| 8,674,926 B2 * | 3/2014 | Nitta | 345/102 |
| 2002/0071141 A1 | 6/2002 | Katakura et al. | |
| 2003/0117435 A1 * | 6/2003 | Hiramatsu et al. | 345/745 |
| 2003/0183748 A1 * | 10/2003 | Yamaguchi | 250/208.1 |
| 2004/0239888 A1 * | 12/2004 | Kobayashi | 353/69 |
| 2005/0195291 A1 * | 9/2005 | Kubo | 348/229.1 |
| 2005/0232476 A1 * | 10/2005 | Hayakawa et al. | 382/141 |
| 2005/0243286 A1 * | 11/2005 | Kobayashi | 353/69 |
| 2007/0110304 A1 | 5/2007 | Tsukada | |
| 2007/0285537 A1 * | 12/2007 | Dwinell et al. | 348/263 |
| 2008/0191985 A1 * | 8/2008 | Katayama et al. | 345/89 |
| 2009/0303263 A1 * | 12/2009 | Minobe | 345/690 |
| 2011/0096191 A1 * | 4/2011 | Nagamine et al. | 348/223.1 |
| 2011/0216189 A1 * | 9/2011 | Nagamine et al. | 348/135 |
| 2011/0243475 A1 * | 10/2011 | Hayakawa et al. | 382/286 |
| 2013/0135429 A1 * | 5/2013 | Lablans | 348/36 |
| 2013/0136364 A1 * | 5/2013 | Kobayashi | 382/195 |

FOREIGN PATENT DOCUMENTS

| | | |
|---|---|---|
| JP | 2002-64688 A | 2/2002 |
| JP | 2005-151418 A | 6/2005 |
| JP | 2008-145471 A | 6/2008 |
| JP | 2010-057149 A | 3/2010 |
| WO | 2005/057941 A | 6/2005 |

* cited by examiner

PATTERN POSITION DETECTION METHOD, PATTERN POSITION DETECTION SYSTEM, AND IMAGE QUALITY ADJUSTMENT TECHNIQUE USING THE METHOD AND SYSTEM

CROSS REFERENCE TO RELATED APPLICATIONS

This application is continuation of and claims the benefit of priority from the prior PCT Application No. PCT/JP2013/053918, filed on Feb. 19, 2013, the entire contents of which are incorporated herein by reference.

TECHNICAL FIELD

The present invention relates to a pattern position detection method and a pattern position detection system that capture patterns displayed on a display panel with a camera and detect the positions of images of the patterns on an imaging surface of the camera, and to an image quality adjustment technique using such method and system.

BACKGROUND ART

It is commonly known that a liquid crystal panel, an organic EL panel and similar display panels exhibit unevenness in display, such as luminance unevenness and color unevenness, due to manufacturing variations such as unevenness in cell gaps and unevenness in the brightness of a backlight. When each pixel in a display panel has RGB display elements, unevenness in luminance occurs if a relative relationship among R, G and B in each individual pixel in terms of brightness does not vary but the absolute brightness varies between neighboring pixels, and unevenness in color occurs if a relative relationship among R, G and B in each individual pixel in terms of brightness varies between neighboring pixels.

There are techniques to improve the image quality of a display panel by reducing such unevenness in display. One example is an image correction data generation system described in PTL 1. This system displays a gray image across the entire display panel, calculates the luminance distribution of the gray image by capturing the gray image with a camera, and generates correction data based on the luminance distribution. The generated correction data is stored in a correction circuit provided in the display panel. When an image signal is input to the display panel, the correction circuit corrects the input signal based on the correction data. As a result, unevenness in display is reduced.

CITATION LIST

Patent Literature

[PLT1] JP 2010-57149A

SUMMARY OF INVENTION

Technical Problem

Correction data can be generated by capturing the display panel in the above manner on the premise that the position of the captured display panel on an imaging surface of the camera is detected accurately. More specifically, for example, when the display panel is captured by a camera including solid-state imaging elements, as correction data is generated based on the amount of light incident on each imaging element on the imaging surface, erroneous correction data is generated unless the brightness of each region of the display panel is accurately detected based on the corresponding imaging element on which light is incident.

In view of this, before displaying a gray image or the like across the entire display panel, patterns used for alignment (alignment patterns) may be displayed by causing certain pixels at known positions on the display panel to emit light (see FIGS. 4A to 4D) and captured by a camera, so as to check the positions of images of the patterns on the imaging surface of the camera.

However, it has been found that accurate detection of the patterns is difficult because, when the patterns displayed on the display panel are actually captured, there are cases where noise caused by the leakage of a backlight from a hole in a frame of the display panel, a luminescent spot on the display panel, incident outside light and the like is erroneously recognized as a constituent of the patterns.

The present invention has been made in view of the above problem, and aims to provide a pattern position detection method and a pattern position detection system that can detect the positions of patterns used for alignment with high accuracy, and to provide an image quality adjustment technology using such method and system.

Solution to Problem

In order to solve the above problem, one embodiment of the invention is a pattern position detection method for capturing patterns displayed on a display panel with a camera and detecting positions of images of the patterns on an imaging surface of the camera. The method includes: a red pattern capturing step of displaying red patterns at predetermined positions on the display panel and capturing the red patterns with the camera; a first black image capturing step of displaying a black image on the display panel and capturing the black image with the camera using a shutter speed and/or an f-number used in the red pattern capturing step; a green pattern capturing step of displaying green patterns at predetermined positions on the display panel and capturing the green patterns with the camera; a second black image capturing step of displaying a black image on the display panel and capturing the black image with the camera using a shutter speed and/or an f-number used in the green pattern capturing step; a blue pattern capturing step of displaying blue patterns at predetermined positions on the display panel and capturing the blue patterns with the camera; a third black image capturing step of displaying a black image on the display panel and capturing the black image with the camera using a shutter speed and/or an f-number used in the blue pattern capturing step; a red pattern position detecting step of detecting positions of images of the red patterns on the imaging surface based on a difference between an image captured in the red pattern capturing step and an image captured in the first black image capturing step; a green pattern position detecting step of detecting positions of images of the green patterns on the imaging surface based on a difference between an image captured in the green pattern capturing step and an image captured in the second black image capturing step; and a blue pattern position detecting step of detecting positions of images of the blue patterns on the imaging surface based on a difference between an image captured in the blue pattern capturing step and an image captured in the third black image capturing step.

Another embodiment of the invention is a pattern position detection method for capturing patterns displayed on a display panel with a camera and detecting positions of images of the patterns on an imaging surface of the camera. The method includes: a primary-color pattern capturing step of displaying primary-color patterns of one of primary colors red, green and blue at predetermined positions on the display panel and capturing the primary-color patterns with the camera; a black image capturing step of displaying a black image on the display panel and capturing the black image with the camera using a shutter speed and/or an f-number used in the primary-color pattern capturing step; and a primary-color pattern position detecting step of detecting positions of images of the primary-color patterns on the imaging surface based on a difference between an image captured in the primary-color pattern capturing step and an image captured in the black image capturing step.

A further embodiment of the invention is a pattern position detection method for capturing patterns displayed on a display panel with a camera and detecting positions of images of the patterns on an imaging surface of the camera. The method includes: a white pattern capturing step of displaying white patterns at predetermined positions on the display panel and capturing the white pattern's with the camera; a black image capturing step of displaying a black image on the display panel and capturing the black image with the camera using a shutter speed and/or an f-number used in the white pattern capturing step; and a white pattern position detecting step of detecting positions of images of the white patterns on the imaging surface based on a difference between an image captured in the white pattern capturing step and an image captured in the black image capturing step.

Still a further embodiment of the invention is a pattern position detection system for capturing patterns displayed on a display panel with a camera and detecting positions of images of the patterns on an imaging surface of the camera. The system includes: a display control means that displays red patterns, green patterns and blue patterns at predetermined positions on the display panel, and a black image on the display panel; a red pattern position detection means that detects positions of images of the red patterns on the imaging surface based on a difference between an image obtained by the camera capturing the red patterns displayed by the display control means on the display panel, and an image obtained by the camera capturing the black image displayed by the display control means on the display panel using a shutter speed and/or an f-number used when capturing the red patterns; a green pattern position detection means that detects positions of images of the green patterns on the imaging surface based on a difference between an image obtained by the camera capturing the green patterns displayed by the display control means on the display panel, and an image obtained by the camera capturing the black image displayed by the display control means on the display panel using a shutter speed and/or an f-number used when capturing the green patterns; and a blue pattern position detection means that detects positions of images of the blue patterns on the imaging surface based on a difference between an image obtained by the camera capturing the blue patterns displayed by the display control means on the display panel, and an image obtained by the camera capturing the black image displayed by the display control means on the display panel using a shutter speed and/or an f-number used when capturing the blue patterns.

Still a further embodiment of the invention is a pattern position detection system for capturing patterns displayed on a display panel with a camera and detecting positions of images of the patterns on an imaging surface of the camera. The system includes: a display control means that displays primary-color patterns of one of primary colors red, green and blue at predetermined positions on the display panel, and a black image on the display panel; and a primary-color pattern position detection means that detects positions of images of the primary-color patterns on the imaging surface based on a difference between an image obtained by the camera capturing the primary-color patterns displayed by the display control means on the display panel, and an image obtained by the camera capturing the black image displayed by the display control means on the display panel using a shutter speed and/or an f-number used when capturing the primary-color patterns.

Another embodiment of the invention is a pattern position detection system for capturing patterns displayed on a display panel with a camera and detecting positions of images of the patterns on an imaging surface of the camera. The system includes: a display control means that displays white patterns at predetermined positions on the display panel, and a black image on the display panel; and a white pattern position detection means that detects positions of images of the white patterns on the imaging surface based on a difference between an image obtained by the camera capturing the white patterns displayed by the display control means on the display panel, and an image obtained by the camera capturing the black image displayed by the display control means on the display panel using a shutter speed and/or an f-number used when capturing the white patterns.

A further embodiment of the invention is a correction data generation method for generating correction data by capturing a display panel with a camera, the correction data being for reducing unevenness in display of the display panel by correcting a signal input to the display panel. The method includes: a red pattern capturing step of displaying red patterns at predetermined positions on the display panel and capturing the red patterns with the camera; a first black image capturing step of displaying a black image on the display panel and capturing the black image with the camera using a shutter speed and/or an f-number used in the red pattern capturing step; a green pattern capturing step of displaying green patterns at predetermined positions on the display panel and capturing the green patterns with the camera; a second black image capturing step of displaying a black image on the display panel and capturing the black image with the camera using a shutter speed and/or an f-number used in the green pattern capturing step; a blue pattern capturing step of displaying blue patterns at predetermined positions on the display panel and capturing the blue patterns with the camera; a third black image capturing step of displaying a black image on the display panel and capturing the black image with the camera using a shutter speed and/or an f-number used in the blue pattern capturing step; a red pattern position detecting step of detecting positions of images of the red patterns on an imaging surface of the camera based on a difference between an image captured in the red pattern capturing step and an image captured in the first black image capturing step; a green pattern position detecting step of detecting positions of images of the green patterns on the imaging surface based on a difference between an image captured in the green pattern capturing step and an image captured in the second black image capturing step; a blue pattern position detecting step of detecting positions of images of the blue patterns on the imaging surface based on a difference between an image captured in the blue pattern capturing step and an image captured in the third black image capturing step; a red image capturing step of displaying a red image on the display panel and capturing the red image with the camera; a green image capturing step of displaying a green image on the display panel and capturing the green image with the camera; a blue image capturing step of displaying a blue image on the display panel and capturing the blue image with the camera; a red correction data generating step of generating correction data for reducing unevenness when displaying red on the display panel based on a result of detection in the red pattern position detecting step and on an image captured in the red image capturing step; a green correction data generating step of generating correction data for reducing unevenness when displaying green on the display panel based on a result of detection in the green pattern position detecting step and on an image captured in the green image capturing step; and a blue correction data generating step of generating correction data for reducing unevenness when displaying blue on the display panel based on a result of detection in the blue pattern position detecting step and on an image captured in the blue image capturing step.

Still a further embodiment of the invention is a correction data generation method for generating correction data by capturing a display panel with a camera, the correction data being for reducing unevenness in display of the display panel by correcting a signal input to the display panel. The method includes: a primary-color pattern capturing step of displaying primary-color patterns of one of primary colors red, green and blue at predetermined positions on the display panel and capturing the primary-color patterns with the camera; a black image capturing step of displaying a black image on the display panel and capturing the black image with the camera using a shutter speed and/or an f-number used in the primary-color pattern capturing step; a primary-color pattern position detecting step of detecting positions of images of the primary-color patterns on an imaging surface of the camera based on a difference between an image captured in the primary-color pattern capturing step and an image captured in the black image capturing step; a first primary-color image capturing step of displaying an image of the above one primary color on the display panel and capturing the image of the above one primary color with the camera; a second primary-color image capturing step of displaying an image of one of two primary colors other than the above one primary color on the display panel and capturing the image of one of two primary colors with the camera; a third primary-color image capturing step of displaying an image of the other of the two primary colors on the display panel and capturing the image of the other of the two primary colors with the camera; a first correction data generating step of generating correction data for reducing unevenness when displaying the above one primary color on the display panel based on a result of detection in the primary-color pattern position detecting step and on an image captured in the first primary-color image capturing step; a second correction data generating step of generating correction data for reducing unevenness when displaying one of the two primary colors on the display panel based on the result of detection in the primary-color pattern position detecting step and on an image captured in the second primary-color image capturing step; and a third correction data generating step of generating correction data for reducing unevenness when displaying the other of the two primary colors on the display panel based on the result of detection in the primary-color pattern position detecting step and on an image captured in the third primary-color image capturing step.

Still a further embodiment of the invention is a correction data generation method for generating correction data by capturing a display panel with a camera, the correction data being for reducing unevenness in display of the display panel by correcting a signal input to the display panel. The method includes: a white pattern capturing step of displaying white patterns at predetermined positions on the display panel and capturing the white patterns with the camera; a black image capturing step of displaying a black image on the display panel and capturing the black image with the camera using a shutter speed and/or an f-number used in the white pattern capturing step; a white pattern position detecting step of detecting positions of images of the white patterns on an imaging surface of the camera based on a difference between an image captured in the white pattern capturing step and an image captured in the black image capturing step; a white image capturing step of displaying a white image on the display panel and capturing the white image with the camera; and a white correction data generating step of generating correction data for reducing unevenness when displaying white on the display panel based on a result of detection in the white pattern position detecting step and on an image captured in the white image capturing step.

Another embodiment of the invention is a correction data generation system for generating correction data by capturing a display panel with a camera, the correction data being for reducing unevenness in display of the display panel by correcting a signal input to the display panel. The system includes: a display control means that displays red patterns, green patterns and blue patterns at predetermined positions on the display panel, and a black image, a red image, a green image and a blue image on the display panel; a red pattern position detection means that detects positions of images of the red patterns on an imaging surface of the camera based on a difference between an image obtained by the camera capturing the red patterns displayed by the display control means on the display panel, and an image obtained by the camera capturing the black image displayed by the display control means on the display panel using a shutter speed and/or an f-number used when capturing the red patterns; a green pattern position detection means that detects positions of images of the green patterns on the imaging surface based on a difference between an image obtained by the camera capturing the green patterns displayed by the display control means on the display panel, and an image obtained by the camera capturing the black image displayed by the display control means on the display panel using a shutter speed and/or an f-number used when capturing the green patterns; a blue pattern position detection means that detects positions of images of the blue patterns on the imaging surface based on a difference between an image obtained by the camera capturing the blue patterns displayed by the display control means on the display panel, and an image obtained by the camera capturing the black image displayed by the display control means on the display panel using a shutter speed and/or an f-number used when capturing the blue patterns; a red correction data generation means that generates correction data for reducing unevenness when displaying red on the display panel based on a result of detection by the red pattern position detection means and on an image obtained by the camera capturing the red image displayed by the display control means on the display panel; a green correction data generation means that generates correction data for reducing unevenness when displaying green on the display panel based on a result of detection by the green pattern position detection means and on an image obtained by the camera capturing the green image displayed by the display control means on the display panel; and a blue correction data generation means that generates correction data for reducing unevenness when displaying blue on the display panel based on a result of detection by the blue pattern position detection means and on an image obtained by the camera capturing the blue image displayed by the display control means on the display panel.

A further embodiment of the invention is a correction data generation system for generating correction data by capturing a display panel with a camera, the correction data being for reducing unevenness in display of the display panel by correcting a signal input to the display panel. The system includes: a display control means that displays, on the display panel, primary-color patterns of one of primary colors red, green and blue at predetermined positions, a black image, an image of the above one primary color, an image of one of two primary colors other than the above one primary color, and an image of the other of the two primary colors; a primary-color pattern position detection means that detects positions of images of the primary-color patterns on an imaging surface of the camera based on a difference between an image obtained by the camera capturing the primary-color patterns displayed by the display control means on the display panel, and an image obtained by the camera capturing the black image displayed by the display control means on the display panel using a shutter speed and/or an f-number used when capturing the primary-color patterns; a first correction data generation means that generates correction data for reducing unevenness when displaying the above one primary color on the display panel based on a result of detection by the primary-color pattern position detection means and on an image obtained by the camera capturing the image of the above one primary color displayed by the display control means on the display panel; a second correction data generation means that generates correction data for reducing unevenness when displaying the image of one of the two primary colors on the display panel based on the result of detection by the primary-color pattern position detection means and on an image obtained by the camera capturing the image of one of the two primary colors displayed by the display control means on the display panel; and a third correction data generation means that generates correction data for reducing unevenness when displaying the image of the other of the two primary colors on the display panel based on the result of detection by the primary-color pattern position detection means and on an image obtained by the camera capturing the image of the other of the two primary colors displayed by the display control means on the display panel.

Still a further embodiment of the invention is a correction data generation system for generating correction data by capturing a display panel with a camera, the correction data being for reducing unevenness in display of the display panel by correcting a signal input to the display panel. The system includes: a display control means that displays white patterns at predetermined positions on the display panel, and a black image and a white image on the display panel; a white pattern position detection means that detects positions of images of the white patterns on an imaging surface of the camera based on a difference between an image obtained by the camera capturing the white patterns displayed by the display control means on the display panel, and an image obtained by the camera capturing the black image displayed by the display control means on the display panel using a shutter speed and/or an f-number used when capturing the white patterns; and a white correction data generation means that generates correction data for reducing unevenness when displaying white on the display panel based on a result of detection by the white pattern position detection means and on an image obtained by the camera capturing the white image displayed by the display control means on the display panel.

Still a further embodiment of the invention is an image quality adjustment method for adjusting image quality of a display panel using correction data for reducing unevenness in display of the display panel by correcting a signal input to the display panel. The method includes: a red pattern capturing step of displaying red patterns at predetermined positions on the display panel and capturing the red patterns with the camera; a first black image capturing step of displaying a black image on the display panel and capturing the black image with the camera using a shutter speed and/or an f-number used in the red pattern capturing step; a green pattern capturing step of displaying green patterns at predetermined positions on the display panel and capturing the green patterns with the camera; a second black image capturing step of displaying a black image on the display panel and capturing the black image with the camera using a shutter speed and/or an f-number used in the green pattern capturing step; a blue pattern capturing step of displaying blue patterns at predetermined positions on the display panel and capturing the blue patterns with the camera; a third black image capturing step of displaying a black image on the display panel and capturing the black image with the camera using a shutter speed and/or an f-number used in the blue pattern capturing step; a red pattern position detecting step of detecting positions of images of the red patterns on an imaging surface of the camera based on a difference between an image captured in the red pattern capturing step and an image captured in the first black image capturing step; a green pattern position detecting step of detecting positions of images of the green patterns on the imaging surface based on a difference between an image captured in the green pattern capturing step and an image captured in the second black image capturing step; a blue pattern position detecting step of detecting positions of images of the blue patterns on the imaging surface based on a difference between an image captured in the blue pattern capturing step and an image captured in the third black image capturing step; a red image capturing step of displaying a red image on the display panel and capturing the red image with the camera; a green image capturing step of displaying a green image on the display panel and capturing the green image with the camera; a blue image capturing step of displaying a blue image on the display panel and capturing the blue image with the camera; a red correction data generating step of generating correction data for reducing unevenness when displaying red on the display panel based on a result of detection in the red pattern position detecting step and on an image captured in the red image capturing step; a green correction data generating step of generating correction data for reducing unevenness when displaying green on the display panel based on a result of detection in the green pattern position detecting step and on an image captured in the green image capturing step; a blue correction data generating step of generating correction data for reducing unevenness when displaying blue on the display panel based on a result of detection in the blue pattern position detecting step and on an image captured in the blue image capturing step; and an input signal correcting step of correcting the signal input to the display panel based on the pieces of correction data generated in the red correction data generating step, the green correction data generating step and the blue correction data generating step.

Another embodiment of the invention is an image quality adjustment method for adjusting image quality of a display panel using correction data for reducing unevenness in display of the display panel by correcting a signal input to the display panel. The method includes: a primary-color pattern capturing step of displaying primary-color patterns of one of primary colors red, green and blue at predetermined positions on the display panel and capturing the primary-color patterns with the camera; a black image capturing step of displaying a black image on the display panel and capturing the black image with the camera using a shutter speed and/or an f-number used in the primary-color pattern capturing step; a primary-color pattern position detecting step of detecting positions of images of the primary-color patterns on an imaging surface of the camera based on a difference between an image captured in the primary-color pattern capturing step and an image captured in the black image capturing step; a first primary-color image capturing step of displaying an image of the above one primary color on the display panel and capturing the image of the above one primary color with the camera; a second primary-color image capturing step of displaying an image of one of two primary colors other than the above one primary color on the display panel and capturing the image of one of the two primary colors with the camera; a third primary-color image capturing step of displaying an image of the other of the two primary colors on the display panel and capturing the image of the other of the two primary colors with the camera; a first correction data generating step of generating correction data for reducing unevenness when displaying the above one primary color on the display panel based on a result of detection in the primary-color pattern position detecting step and on an image captured in the first primary-color image capturing step; a second correction data generating step of generating correction data for reducing unevenness when displaying one of the two primary colors on the display panel based on the result of detection in the primary-color pattern position detecting step and on an image captured in the second primary-color image capturing step; a third correction data generating step of generating correction data for reducing unevenness when displaying the other of the two primary colors on the display panel based on the result of detection in the primary-color pattern position detecting step and on an image captured in the third primary-color image capturing step; and an input signal correcting step of correcting the signal input to the display panel based on the pieces of correction data generated in the first correction data generating step, the second correction data generating step and the third correction data generating step.

A further embodiment of the invention is an image quality adjustment method for adjusting image quality of a display panel using correction data for reducing unevenness in display of the display panel by correcting a signal input to the display panel. The method includes: a white pattern capturing step of displaying white patterns at predetermined positions on the display panel and capturing the white patterns with the camera; a black image capturing step of displaying a black image on the display panel and capturing the black image with the camera using a shutter speed and/or an f-number used in the white pattern capturing step; a white pattern position detecting step of detecting positions of images of the white patterns on an imaging surface of the camera based on a difference between an image captured in the white pattern capturing step and an image captured in the black image capturing step; a white image capturing step of displaying a white image on the display panel and capturing the white image with the camera; a white correction data generating step of generating correction data for reducing unevenness when displaying white on the display panel based on a result of detection in the white pattern position detecting step and on an image captured in the white image capturing step; and an input signal correcting step of correcting the signal input to the display panel based on the correction data generated in the white correction data generating step.

Still a further embodiment of the invention is a method for manufacturing a display panel with image quality adjustment functions including a display panel and an image quality adjustment means provided with a storage having stored therein correction data for reducing unevenness in display of the display panel by correcting a signal input to the display panel. The method includes: a red pattern capturing step of displaying red patterns at predetermined positions on the display panel and capturing the red patterns with the camera; a first black image capturing step of displaying a black image on the display panel and capturing the black image with the camera using a shutter speed and/or an f-number used in the red pattern capturing step; a green pattern capturing step of displaying green patterns at predetermined positions on the display panel and capturing the green patterns with the camera; a second black image capturing step of displaying a black image on the display panel and capturing the black image with the camera using a shutter speed and/or an f-number used in the green pattern capturing step; a blue pattern capturing step of displaying blue patterns at predetermined positions on the display panel and capturing the blue patterns with the camera; a third black image capturing step of displaying a black image on the display panel and capturing the black image with the camera using a shutter speed and/or an f-number used in the blue pattern capturing step; a red pattern position detecting step of detecting positions of images of the red patterns on an imaging surface of the camera based on a difference between an image captured in the red pattern capturing step and, an image captured in the first black image capturing step; a green pattern position detecting step of detecting positions of images of the green patterns on the imaging surface based on a difference between an image captured in the green pattern capturing step and an image captured in the second black image capturing step; a blue pattern position detecting step of detecting positions of images of the blue patterns on the imaging surface based on a difference between an image captured in the blue pattern capturing step and an image captured in the third black image capturing step; a red image capturing step of displaying a red image on the display panel and capturing the red image with the camera; a green image capturing step of displaying a green image on the display panel and capturing the green image with the camera; a blue image capturing step of displaying a blue image on the display panel and capturing the blue image with the camera; a red correction data generating step of generating correction data for reducing unevenness when displaying red on the display panel based on a result of detection in the red pattern position detecting step and on an image captured in the red image capturing step; a green correction data generating step of generating correction data for reducing unevenness when displaying green on the display panel based on a result of detection in the green pattern position detecting step and on an image captured in the green image capturing step; a blue correction data generating step of generating correction data for reducing unevenness when displaying blue on the display panel based on a result of detection in the blue pattern position detecting step and on an image captured in the blue image capturing step; a correction data storing step of storing the pieces of correction data generated in the red correction data generating step, the green correction data generating step and the blue correction data generating step in the storage; and a mounting step of mounting the image quality adjustment means on the display panel so that the image quality adjustment means corrects the signal input to the display panel based on the pieces of correction data.

Still a further embodiment of the invention is a method for manufacturing a display panel with image quality adjustment functions including a display panel and an image quality adjustment means provided with a storage having stored therein correction data for reducing unevenness in display of the display panel by correcting a signal input to the display panel. The method includes: a primary-color pattern capturing step of displaying primary-color patterns of one of primary colors red, green and blue at predetermined positions on the display panel and capturing the primary-color patterns with the camera; a black image capturing step of displaying a black image on the display panel and capturing the black image with the camera using a shutter speed and/or an f-number used in the primary-color pattern capturing step; a primary-color pattern position detecting step of detecting positions of images of the primary-color patterns on an imaging surface of the camera based on a difference between an image captured in the primary-color pattern capturing step and an image captured in the black image capturing step; a first primary-color image capturing step of displaying an image of the above one primary color on the display panel and capturing the image of the above one primary color with the camera; a second primary-color image capturing step of displaying an image of one of two primary colors other than the above one primary color on the display panel and capturing the image of one of the two primary colors with the camera; a third primary-color image capturing step of displaying an image of the other of the two primary colors on the display panel and capturing the image of the other of the two primary colors with the camera; a first correction data generating step of generating correction data for reducing unevenness when displaying the above one primary color on the display panel based on a result of detection in the primary-color pattern position detecting step and on an image captured in the first primary-color image capturing step; a second correction data generating step of generating correction data for reducing unevenness when displaying one of the two primary colors on the display panel based on the result of detection in the primary-color pattern position detecting step and on an image captured in the second primary-color image capturing step; a third correction data generating step of generating correction data for reducing unevenness when displaying the other of the two primary colors on the display panel based on the result of detection in the primary-color pattern position detecting step and on an image captured in the third primary-color image capturing step; a correction data storing step of storing the pieces of correction data generated in the first correction data generating step, the second correction data generating step and the third correction data generating step in the storage; and a mounting step of mounting the image quality adjustment means on the display panel so that the image quality adjustment means corrects the signal input to the display panel based on the pieces of correction data.

Another embodiment of the invention is a method for manufacturing a display panel with image quality adjustment functions including a display panel and an image quality adjustment means provided with a storage having stored therein correction data for reducing unevenness in display of the display panel by correcting a signal input to the display panel. The method includes: a white pattern capturing step of displaying white patterns at predetermined positions on the display panel and capturing the white patterns with the camera; a black image capturing step of displaying a black image on the display panel and capturing the black image with the camera using a shutter speed and/or an f-number used in the white pattern capturing step; a white pattern position detecting step of detecting positions of images of the white patterns on an imaging surface of the camera based on a difference between an image captured in the white pattern capturing step and an image captured in the black image capturing step; a white image capturing step of displaying a white image on the display panel and capturing the white image with the camera; a white correction data generating step of generating correction data for reducing unevenness when displaying white on the display panel based on a result of detection in the white pattern position detecting step and on an image captured in the white image capturing step; a correction data storing step of storing the correction data generated in the white correction data generating step in the storage; and a mounting step of mounting the image quality adjustment means on the display panel so that the image quality adjustment means corrects the signal input to the display panel based on the correction data.

A further embodiment of the invention is a display panel with image quality adjustment functions including a display panel and an image quality adjustment means provided with a storage having stored therein correction data for reducing unevenness in display of the display panel by correcting a signal input to the display panel. Red patterns are displayed at predetermined positions on the display panel and captured by a camera, a black image is displayed on the display panel and captured by the camera using a shutter speed and/or an f-number used when capturing the red, patterns, positions of images of the red patterns on an imaging surface of the camera are detected based on a difference between a captured image of the red patterns and, a captured image of the black image, and a red image is displayed on the display panel and captured by the camera. Green patterns are displayed at predetermined positions on the display panel and captured by the camera, a black image is displayed on the display panel and captured by the camera using a shutter speed and/or an f-number used when capturing the green patterns, positions of images of the green patterns on the imaging surface are detected based on a difference between a captured image of the green patterns and a captured image of the black image, and a green image is displayed on the display panel and captured by the camera. Blue patterns are displayed at predetermined positions on the display panel and captured by the camera, a black image is displayed on the display panel and captured by the camera using a shutter speed and/or an f-number used when capturing the blue patterns, positions of images of the blue patterns on the imaging surface are detected based on a difference between a captured image of the blue patterns and a captured image of the black image, and a blue image is displayed on the display panel and captured by the camera. The storage stores therein: correction data for reducing unevenness when displaying red on the display panel, the correction data being generated based on a result of detecting the positions of the images of the red patterns and on a captured image of the red image; correction data for reducing unevenness when displaying green on the display panel, the correction data being generated based on a result of detecting the positions of the images of the green patterns and on a captured image of the green image; and correction data for reducing unevenness when displaying blue on the display panel, the correction data being generated based on a result of detecting the positions of the images of the blue patterns and on a captured image of the blue image.

Still a further embodiment of the invention is a display panel with image quality adjustment functions including a display panel and an image quality adjustment means provided with a storage having stored therein correction data for reducing unevenness in display of the display panel by correcting a signal input to the display panel. Primary-color patterns of one of primary colors red, green and blue are displayed at predetermined positions on the display panel and captured by a camera, a black image is displayed on the display panel and captured by the camera using a shutter speed and/or an f-number used when capturing the primary-color patterns, positions of images of the primary-color patterns on an imaging surface of the camera are detected based on a difference between a captured image of the primary-color patterns and a captured image of the black image, and an image of the above one primary color is displayed on the display panel and captured by the camera. An image of one of two primary colors other than the above one primary color is displayed on the display panel and captured by the camera. An image of the other of the two primary colors is displayed on the display panel and captured by the camera. The storage stores therein: correction data for reducing unevenness when displaying the above one primary color on the display panel, the correction data being generated based on a result of detecting the positions of the images of the primary-color patterns and on a captured image of the image of the above one primary color; correction data for reducing unevenness when displaying one of the two primary colors on the display panel, the correction data being generated based on a result of detecting the positions of the images of the primary-color patterns and on a captured image of the image of one of the two primary colors; and correction data for reducing unevenness when displaying the other of the two primary colors on the display panel, the correction data being generated based on a result of detecting the positions of the images of the primary-color patterns and on a captured image of the image of the other of the two primary colors.

Still a further embodiment of the invention is a display panel with image quality adjustment functions including a display panel and an image quality adjustment means provided with a storage having stored therein correction data for reducing unevenness in display of the display panel by correcting a signal input to the display panel. White patterns are displayed at predetermined positions on the display panel and captured by a camera, a black image is displayed on the display panel and captured by the camera using a shutter speed and/or an f-number used when capturing the white patterns, positions of images of the white patterns on an imaging surface of the camera are detected based on a difference between a captured image of the white patterns and a captured image of the black image, and a white image is displayed on the display panel and captured by the camera. The storage stores therein correction data for reducing unevenness when displaying white on the display panel, the correction data being generated based on a result of detecting the positions of the images of the white patterns and on a captured image of the white image.

According to another embodiment, red patterns displayed on the display panel are captured by the camera, a black image displayed on the display panel is captured by the camera using a shutter speed and/or an f-number used when capturing the red patterns, and positions of images of the red patterns on the imaging surface of the camera are detected based on a difference between a captured image of the red patterns and a captured image of the black image.

Therefore, even when the captured image of the red patterns includes noise caused by the leakage of a backlight from a hole in a frame of the display panel, a luminescent spot on the display panel, incident outside light and the like, such noise is included similarly in the captured image of the black image and can thus be removed by subtracting the captured image of the black image from the captured image of the red patterns.

That is to say; the positions of the images of the red patterns on the imaging surface of the camera are detected with high accuracy from a difference image from which noise has been removed (an image obtained by subtracting the captured image of the black image from the captured image of the red patterns).

Furthermore, green patterns displayed on the display panel are captured by the camera, a black image displayed on the display panel is captured by the camera using a shutter speed and/or an f-number used when capturing the green patterns, and positions of images of the green patterns on the imaging surface of the camera are detected based on a difference between a captured image of the green patterns and a captured image of the black image. That is to say, the positions of the images of the green patterns on the imaging surface of the camera are detected with high accuracy from a difference image from which noise has been removed (an image obtained by subtracting the captured image of the black image from the captured image of the green patterns).

Furthermore, blue patterns displayed on the display panel are captured by the camera, a black image displayed on the display panel is captured by the camera using a shutter speed and/or an f-number used when capturing the blue patterns, and positions of images of the blue patterns on the imaging surface of the camera are detected based on a difference between a captured image of the blue patterns and a captured image of the black image. That is to say, the positions of the images of the blue patterns on the imaging surface of the camera are detected with high accuracy from a difference image from which noise has been removed (an image obtained by subtracting the captured image of the black image from the captured image of the blue patterns).

According to another embodiment, primary-color patterns displayed on the display panel are captured by the camera, a black image displayed on the display panel is captured by the camera using a shutter speed and/or an f-number used when capturing the primary-color patterns, and positions of images of the primary-color patterns on the imaging surface of the camera are detected based on a difference between a captured image of the primary-color patterns and a captured image of the black image (note that in the present description, "primary color" denotes red, green or blue, and it suffices for red, green and blue to have a peak wavelength of approximately 625 nm to 740 nm, 500 nm to 560 nm and 445 nm to 485 nm, respectively).

Therefore, even when the captured image of the primary-color patterns includes noise caused by the leakage of a backlight from a hole in a frame of the display panel, a luminescent spot on the display panel, incident outside light and the like, such noise is included similarly in the captured image of the black image and can thus be removed by subtracting the captured image of the black image from the captured image of the primary-color patterns.

As a result, the positions of the images of the primary-color patterns on the imaging surface of the camera are detected with high accuracy from a difference image from which noise has been removed (an image obtained by subtracting the captured image of the black image from the captured image of the primary-color patterns).

According to another embodiment, white patterns displayed on the display panel are captured by the camera, a black image displayed on the display panel is captured by the camera using a shutter speed and/or an f-number used when capturing the white patterns, and positions of images of the white patterns on the imaging surface of the camera are detected based on a difference between a captured image of the white patterns and a captured image of the black image.

Therefore, even when the captured image of the white patterns includes noise caused by the leakage of a backlight from a hole in a frame of the display panel, a luminescent spot on the display panel, incident outside light and the like, such noise is included similarly in the captured image of the black image and can thus be removed by subtracting the captured image of the black image from the captured image of the white patterns.

As a result, the positions of the images of the white patterns on the imaging surface of the camera are detected with high accuracy from a difference image from which noise has been removed (an image obtained by subtracting the captured image of the black image from the captured image of the white patterns).

According to another embodiment, the positions of the images of the red patterns, green patterns and blue patterns on the imaging surface of the camera are all detected with high accuracy from difference images from which noise has been removed.

Correction data for reducing unevenness when displaying red on the display panel is generated based on the result of detecting the positions of the images of the red patterns and on a captured image of a red image. Correction data for reducing unevenness when displaying green on the display panel is generated based on the result of detecting the positions of the images of the green patterns and on a captured image of a green image. Correction data for reducing unevenness when displaying blue on the display panel is generated based on the result of detecting the positions of the images of the blue patterns and on a captured image of a blue image. As the positions of the images of the red patterns, green patterns and blue patterns are detected with high accuracy in the above manner, the pieces of correction data used when displaying red, green and blue on the display panel can also be calculated with high accuracy.

According to another embodiment, the positions of images of primary-color patterns on the imaging surface of the camera are detected with high accuracy from a difference image from which noise has been removed.

Correction data for reducing unevenness when displaying one primary color on the display panel is generated based on the result of detecting the positions of the images of the primary-color patterns and on a captured image of an image of this one primary color. As the positions of the images of the primary-color patterns are detected with high accuracy in the above manner, the correction data used when displaying this one primary color on the display panel can also be calculated with high accuracy.

Furthermore, correction data for reducing unevenness when displaying one of two primary colors other than the above one primary color on the display panel is generated based on the result of detecting the positions of the images of the primary-color patterns and on a captured image of an image of one of the two primary colors. Correction data for reducing unevenness when displaying the other of the two primary colors on the display panel is generated based on the result of detecting the positions of the images of the primary-color patterns and on a captured image of an image of the other of the two primary colors. As the positions of the images of the primary-color patterns are detected with high accuracy in the above manner, the pieces of correction data used when displaying the two primary colors on the display panel can also be calculated with high accuracy.

According to another embodiment, the positions of images of white patterns on the imaging surface of the camera are detected with high accuracy from a difference image from which noise has been removed.

Correction data for reducing unevenness when displaying white on the display panel is generated based on the result of detecting the positions of the images of the white patterns and on a captured image of a white image. As the positions of the images of the white patterns are detected with high accuracy in the above manner, the correction data used when displaying white on the display panel can also be calculated with high accuracy.

According to another embodiment, the positions of images of red patterns, green patterns and blue patterns on the imaging surface of the camera are all detected with high accuracy from difference images from which noise has been removed. Therefore, pieces of correction data used when displaying red, green and blue on the display panel can be calculated with high accuracy.

Furthermore, as a signal input to the display panel is corrected based on these pieces of correction data, unevenness in display of the display panel can be reduced effectively and the image quality thereof can be adjusted with high accuracy. In particular, even when the position of an image of a single pixel in the display panel significantly varies among displayed colors on the imaging surface of the camera due to variations in the position of each RGB display element in the display panel or to the chromatic aberration of magnification of a lens in the camera, the signal input to the display panel can be corrected precisely for any color displayed in accordance with the pieces of correction data used when displaying red, green and blue. As a result, high image quality is achieved.

According to another embodiment, the positions of images of primary-color patterns on the imaging surface of the camera are detected with high accuracy from a difference image from which noise has been removed. Therefore, pieces of correction data used when displaying three primary colors (red, green and blue) on the display panel can be calculated with high accuracy.

Furthermore, as a signal input to the display panel is corrected based on these pieces of correction data, unevenness in display of the display panel can be reduced effectively, and the image quality thereof can be adjusted with high accuracy. In particular, even when the position of an image of a single pixel in the display panel significantly varies among displayed colors on the imaging surface of the camera due to variations in the position of each RGB display element in the display panel or to the chromatic aberration of magnification of a lens in the camera, the signal input to the display panel can be corrected precisely for any color displayed in accordance with the pieces of correction data used when displaying red, green and blue. As a result, high image quality is achieved.

Furthermore, the number of captured images is small compared to previously stated embodiments, and therefore the takt time required to generate correction data can be reduced.

According to another embodiment, the positions of images of white patterns on the imaging surface of the camera are detected with high accuracy from a difference image from which noise has been removed. Therefore, correction data used when displaying white on the display panel can be calculated with high accuracy.

Furthermore, as a signal input to the display panel is corrected based on these pieces of correction data, unevenness in display of the display panel can be reduced effectively, and the image quality thereof can be adjusted with high accuracy. In particular, when unevenness in color and unevenness with high-frequency components (unevenness with sudden changes) are not prominent on the display panel, sufficient effects can be achieved, and the takt time required to generate correction data can be further reduced compared previously stated embodiments.

Advantageous Effects of Invention

The present invention enables detection of positions of patterns with high accuracy, thereby allowing for generation of correction data for reducing unevenness in display of a display panel with high accuracy and improvement in the image quality of the display panel.

DESCRIPTION OF EMBODIMENTS

The following describes embodiments of the present invention with reference to the drawings.

Embodiment 1

Figure 1:
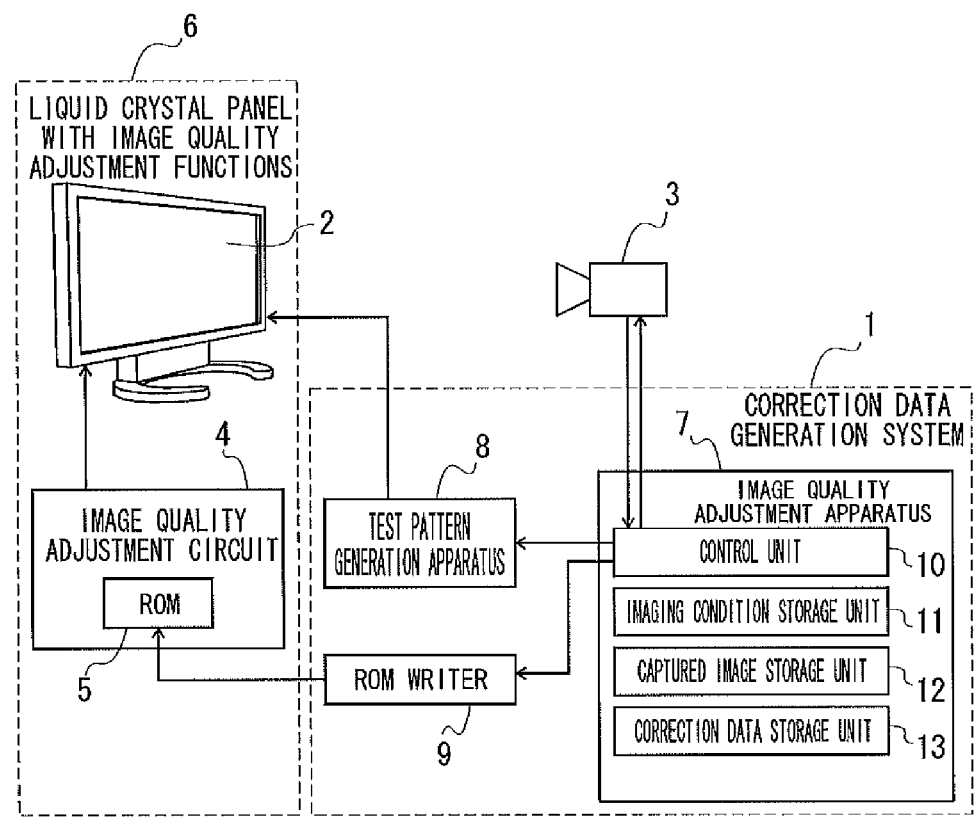
FIG. 1 illustrates a correction data generation system pertaining to embodiments of the invention.

FIG. 1 illustrates a correction data generation system pertaining to the present embodiment. A correction data generation system 1 displays various types of patterns on a liquid crystal panel 2, captures the displayed various types of patterns with a black-and-white camera 3 including solid-state imaging elements, and generates correction data for reducing unevenness in display of the liquid crystal panel 2. The generated correction data is stored in a ROM (non-volatile memory) 5 in an image quality adjustment circuit 4. A liquid crystal panel 6 with image quality adjustment functions is manufactured by mounting this image adjustment circuit 4 on the liquid crystal panel 2. In the liquid crystal panel 6 with image quality adjustment functions, the image quality adjustment circuit 4 corrects an image signal input to the liquid crystal panel 2 (input signal) with reference to the correction data stored in the ROM 5. As a result, unevenness in display of the liquid crystal panel 2 is reduced, and the image quality is adjusted.

The correction data generation system 1 includes an image quality adjustment apparatus 7 connected to a camera 3, a test pattern generation apparatus 8 connected to the liquid crystal panel 2 and to the image quality adjustment apparatus 7, and a ROM writer 9 connected to the image quality adjustment apparatus 7. The image quality adjustment apparatus 7 includes a control unit 10, an imaging condition storage unit 11, a captured image storage unit 12, and a correction data storage unit 13.

Figure 2:
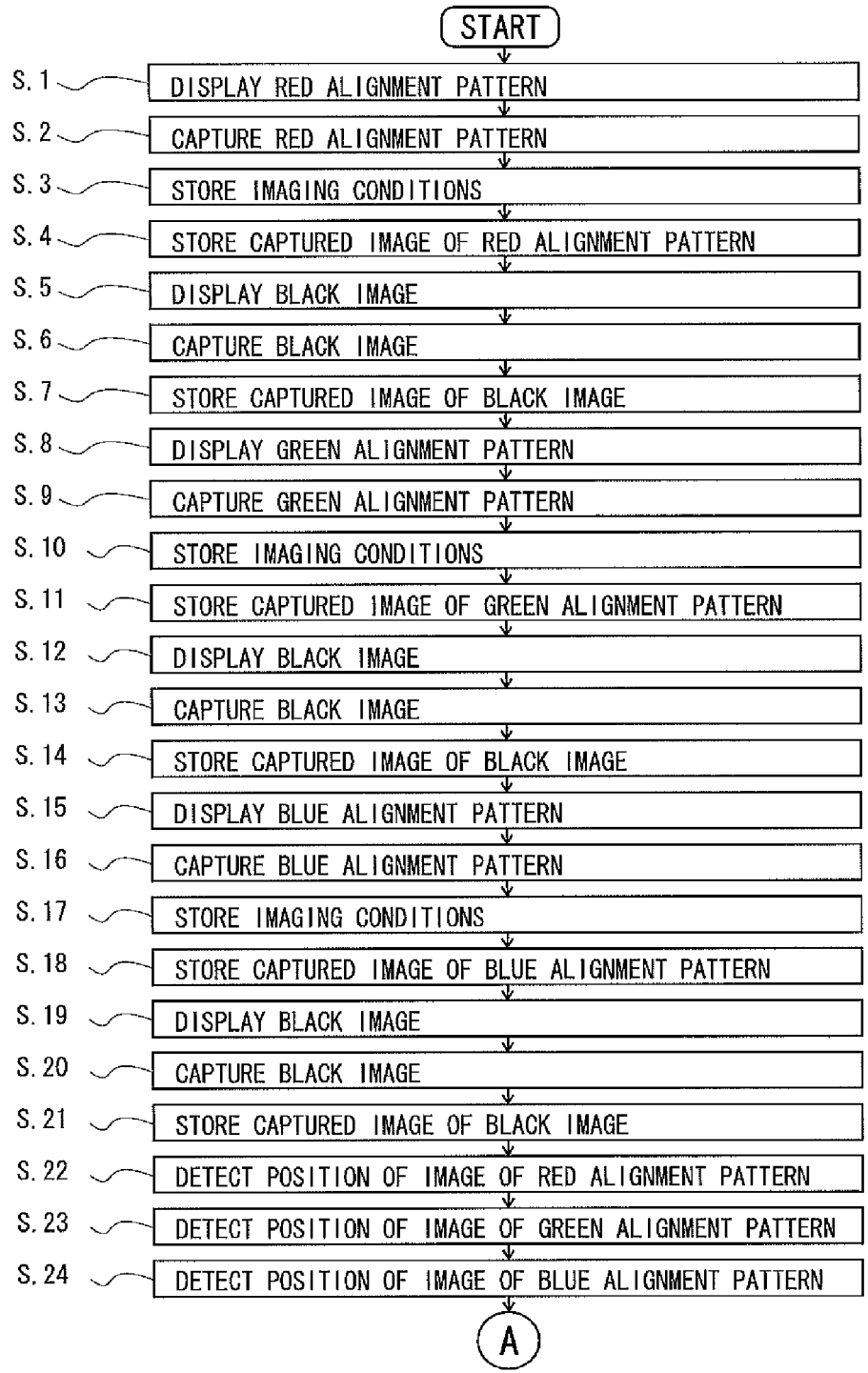
FIG. 2 is a flowchart showing the first half of processing of a pattern position detection method, a correction data generation method, a method for manufacturing a display panel with image quality adjustment functions, and an image quality adjustment method pertaining to Embodiment 1.
Figure 3:
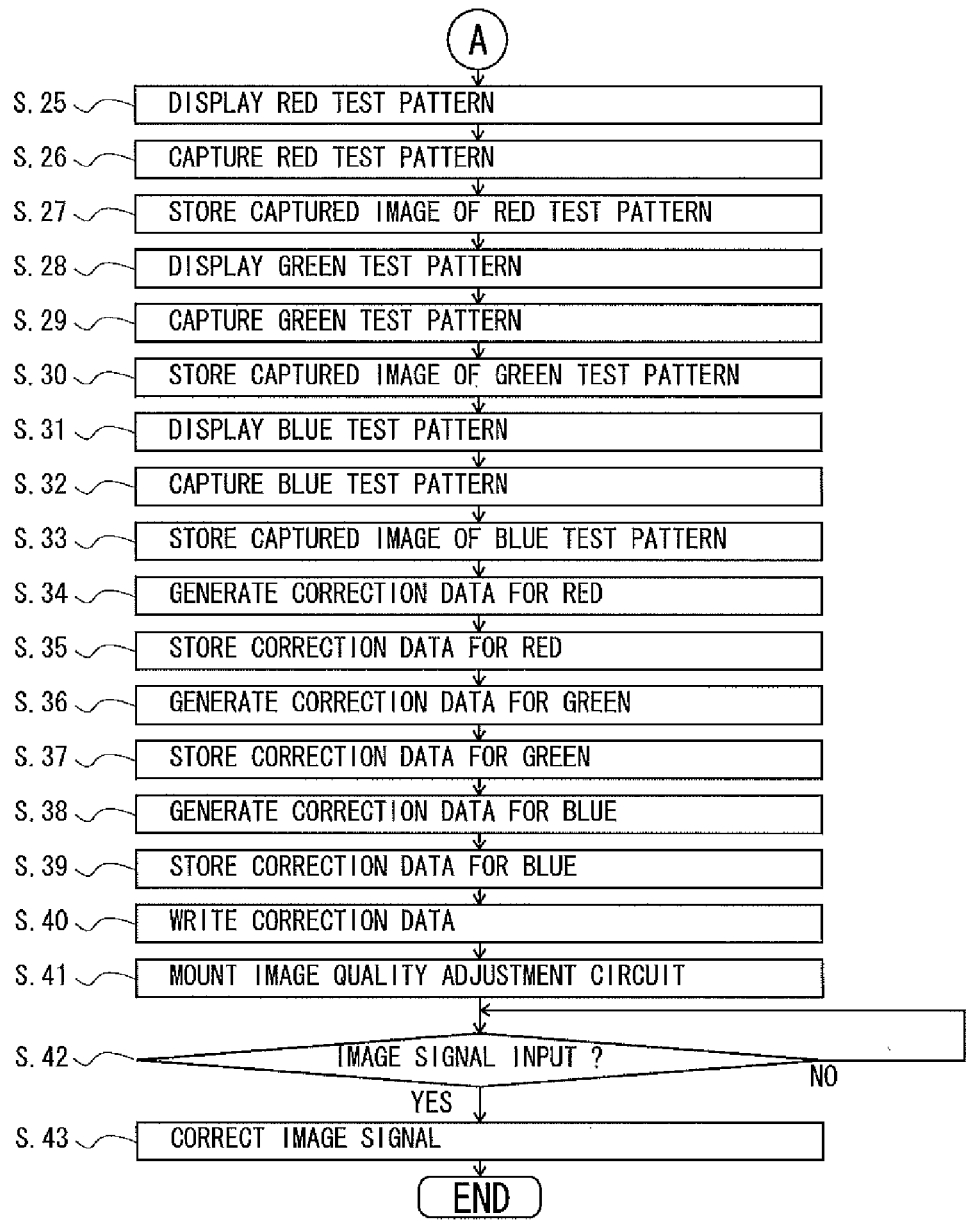
FIG. 3 is a flowchart showing the second half of the processing of the pattern position detection method, the correction data generation method, the method for manufacturing the display panel with image quality adjustment functions, and the image quality adjustment method pertaining to Embodiment 1.
Figure 4:
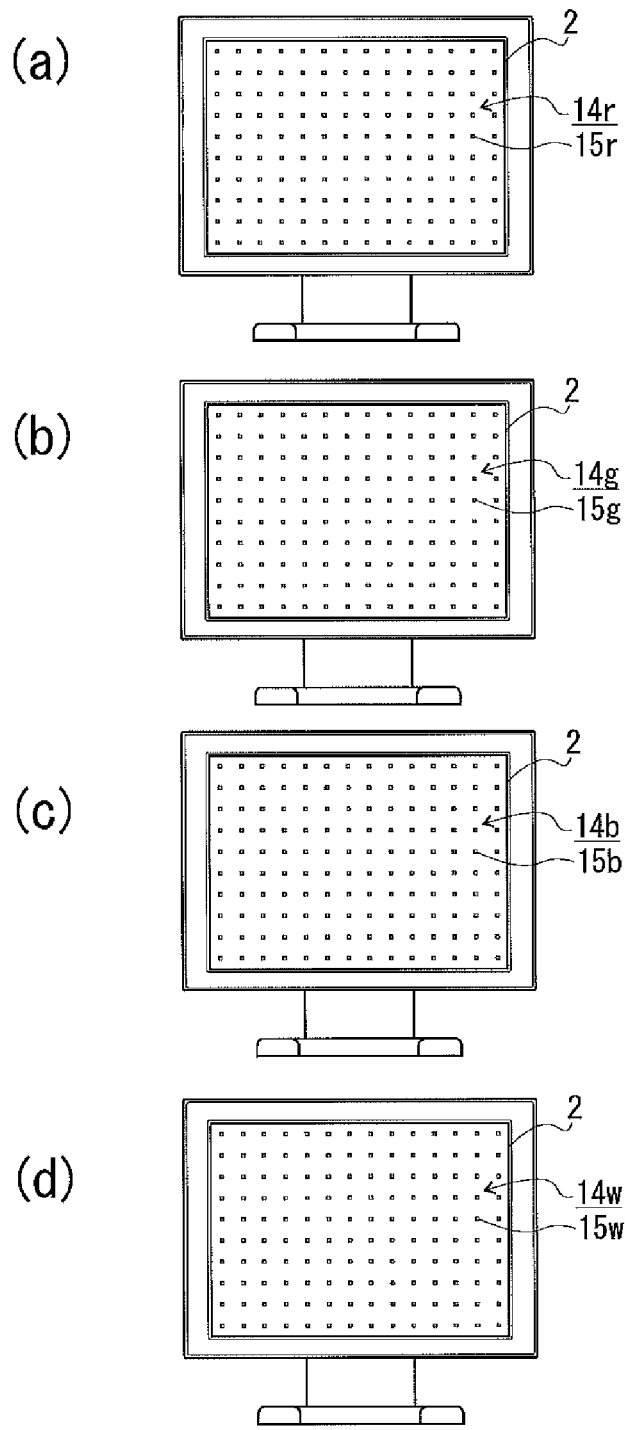
FIG. 4A illustrates red alignment patterns pertaining to Embodiment 1.
FIG. 4B illustrates green alignment patterns pertaining to Embodiments 1 and 2.
FIG. 4C illustrates blue alignment patterns pertaining to Embodiment 1.
FIG. 4D illustrates white alignment patterns pertaining to Embodiment 3.

As illustrated in FIGS. 2 and 3, in order for the correction data generation system 1 to generate correction data, the control unit 10 of the image quality adjustment apparatus 7 first instructs the test pattern generation apparatus 8 to transmit an alignment pattern display signal (R signal) to the liquid crystal panel 2 so as to display red alignment patterns 14r illustrated in FIG. 4A on the liquid crystal panel 2 (step 1 (labeled "S. 1" in FIG. 2, the same applies below)). The alignment patterns 14r are red square-shaped dots 15r arranged in a matrix, and are realized by certain pixels at known positions on the liquid crystal panel 2 displaying red.

Figure 5:
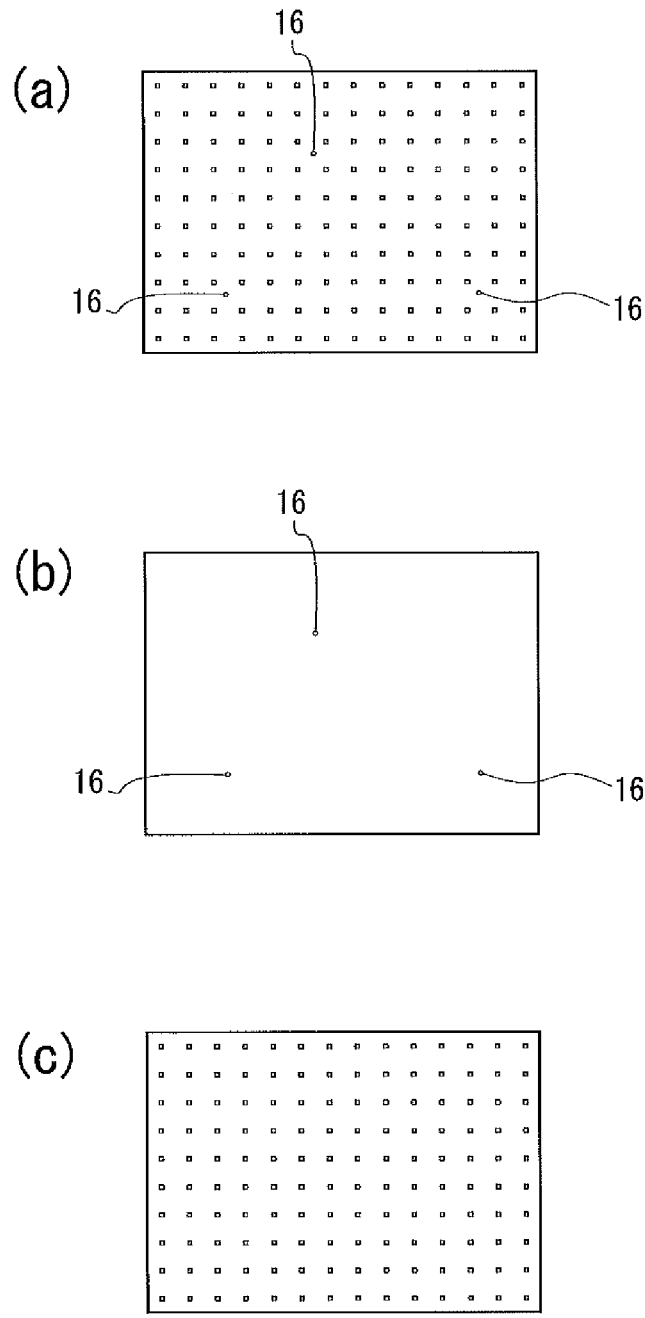
FIG. 5A illustrates a captured image of red alignment patterns.
FIG. 5B illustrates an image obtained by capturing a black image under the same conditions as the red alignment patterns illustrated in FIG. 5A.
FIG. 5C illustrates a difference image showing a difference between the captured images illustrated in FIGS. 5A and 5B.

Next, the control unit 10 captures the liquid crystal panel 2 displaying the red alignment patterns 14r with the camera 3 using an appropriate focus, shutter speed and f-number (diaphragm value) (step 2), stores these focus, shutter speed and f-number in the imaging condition storage unit 11 (step 3), and stores a captured image of the red alignment patterns 14r (FIG. 5A) in the captured image storage unit 12 (step 4).

Subsequently, the control unit 10 instructs the test pattern generation apparatus 8 to display a black image across the entire liquid crystal panel 2 (step 5), captures the displayed black image with the camera 3 using the focus, shutter speed and f-number stored in the imaging condition storage unit 11 (the focus, shutter speed and f-number that were used in step 2) (step 6), and stores a captured image of the black image (FIG. 5B) in the captured image storage unit 12 (step 7).

In a manner similar to steps 1 to 7, the control unit 10 instructs the test pattern generation apparatus 8 to transmit an alignment pattern display signal (G signal) to the liquid crystal panel 2 so as to display green alignment patterns 14g illustrated in FIG. 4B on the liquid crystal panel 2 (step 8). The alignment patterns 14g are green square-shaped dots 15g arranged in a matrix, and are realized by the aforementioned certain pixels displaying green. The control unit 10 captures the liquid crystal panel 2 displaying the green alignment patterns 14g with the camera 3 using an appropriate focus, shutter speed and f-number (step 9), stores these focus, shutter speed and f-number in the imaging condition storage unit 11 (step 10), and stores a captured image of the green alignment patterns 14g in the captured image storage unit 12 (step 11). Furthermore, the control unit 10 instructs the test pattern generation apparatus 8 to display a black image across the entire liquid crystal panel 2 (step 12), captures the displayed black image with the camera 3 using the focus, shutter speed and f-number stored in the imaging condition storage unit 11 (the focus, shutter speed and f-number that were used in step 9) (step 13), and stores a captured image of the black image in the captured image storage unit 12 (step 14).

Also, the control unit 10 instructs the test pattern generation apparatus 8 to transmit an alignment pattern display signal (B signal) to the liquid crystal panel 2 so as to display blue alignment patterns 14b illustrated in FIG. 4C on the liquid crystal panel 2 (step 15). The alignment patterns 14b are blue square-shaped dots 15*b* arranged in a matrix, and are realized by the aforementioned certain pixels displaying blue. The control unit 10 captures the liquid crystal panel 2 displaying the blue alignment patterns 14*b* with the camera 3 using an appropriate focus, shutter speed and f-number (step 16), stores these focus, shutter speed and f-number in the imaging condition storage unit 11 (step 17), and stores a captured image of the blue alignment patterns 14*b* in the captured image storage unit 12 (step 18). Furthermore, the control unit 10 instructs the test pattern generation apparatus 8 to display a black image across the entire liquid crystal panel 2 (step 19), captures the displayed black image with the camera 3 using the focus, shutter speed and f-number stored in the imaging condition storage unit 11 (the focus, shutter speed and f-number that were used in step 16) (step 20), and stores a captured image of the black image in the captured image storage unit 12 (step 21).

Upon completion of the above imaging sequence, the control unit 10 detects the positions of images of the red alignment patterns 14*r* on an imaging surface of the camera 3 based on a difference between the following images stored in the captured image storage unit 12: the captured image of the red alignment patterns 14*r* and the captured image of the black image, which were captured under the same conditions (focus, shutter speed and f-number) (step 22). More specifically, the control unit 10 obtains a difference image for the red alignment patterns 14*r* (FIG. 5C) by subtracting the captured image of the black image from the captured image of the red alignment patterns 14*r*, which were captured under the same conditions. Assuming that the dots shown in this difference image correspond to the aforementioned certain pixels displaying red, the control unit 10 detects imaging elements on the imaging surface of the camera 3 to which images of the aforementioned certain pixels correspond when displaying red.

In a manner similar to step 22, the control unit 10 detects the positions of images of the green alignment patterns 14*g* on the imaging surface of the camera 3 based on a difference between the following images stored in the captured image storage unit 12: the captured image of the green alignment patterns 14*g* and the captured image of the black image, which were captured under the same conditions (step 23). The control unit 10 also detects the positions of images of the blue alignment patterns 14*b* on the imaging surface of the camera 3 based on a difference between the following images stored in the captured image storage unit 12: the captured image of the blue alignment patterns 14*b* and the captured image of the black image, which were captured under the same conditions (step 24).

Once the control unit 10 has detected the positions of the images of the alignment patterns 14*r*, 14*g* and 14*b* on the imaging surface of the camera 3, the control unit 10 instructs the test pattern generation apparatus 8 to transmit a test pattern display signal (R signal) to the liquid crystal panel 2 so as to display red test patterns on the liquid crystal panel 2 (step 25). The red test patterns are realized by all pixels in the liquid crystal panel 2 displaying red using a predetermined tone, and are presented as a red image displayed across the entire liquid crystal panel 2. The control unit 10 captures the liquid crystal panel 2 displaying the red test patterns with the camera 3 using an appropriate focus, shutter speed and f-number (step 26), and stores a captured image of the red test patterns in the captured image storage unit 12 (step 27).

In a manner similar to steps 25 to 27, the control unit 10 instructs the test pattern generation apparatus 8 to transmit a test pattern display signal (G signal) to the liquid crystal panel 2 so as to display green test patterns on the liquid crystal panel 2 (step 28). The green test patterns are realized by all pixels in the liquid crystal panel 2 displaying green using a predetermined tone, and are presented as a green image displayed across the entire liquid crystal panel 2. The control unit 10 captures the liquid crystal panel 2 displaying the green test patterns with the camera 3 using an appropriate focus, shutter speed and f-number (step 29), and stores a captured image of the green test patterns in the captured image storage unit 12 (step 30).

The control unit 10 also instructs the test pattern generation apparatus 8 to transmit a test pattern display signal (B signal) to the liquid crystal panel 2 so as to display blue test patterns on the liquid crystal panel 2 (step 31). The blue test patterns are realized by all pixels in the liquid crystal panel 2 displaying blue using a predetermined tone, and are presented as a blue image displayed across the entire liquid crystal panel 2. The control unit 10 captures the liquid crystal panel 2 displaying the blue test patterns with the camera 3 using an appropriate focus, shutter speed and f-number (step 32), and stores a captured image of the blue test patterns in the captured image storage unit 12 (step 33).

Once the control unit 10 has captured the above test patterns, the control unit 10 generates correction data for reducing unevenness in luminance when displaying red on the liquid crystal panel 2 based on the result of detecting the positions of the images of the red, alignment patterns 14*r* in step 22 and on the captured image of the red test patterns (step 34), and stores the correction data in the correction data storage unit 13 (step 35).

More specifically, the control unit 10 knows the imaging elements in the camera 3 to which the aforementioned certain pixels in the liquid crystal panel 2 correspond as a result of detecting the positions of the images of the red alignment patterns 14*r*. Therefore, with regard to other imaging elements that do not correspond to the aforementioned certain pixels, the control unit 10 can also calculate to which pixels or regions in the liquid crystal panel 2 these other imaging elements correspond through arithmetic operations such as interpolation. That is to say, the luminance of each pixel or region in the liquid crystal panel 2 is calculated based on the captured image of the red test patterns (the amount of light incident on each imaging element in the camera 3 when capturing the red test patterns). This allows obtaining two-dimensional luminance distribution data for the case where the liquid crystal panel 2 displays red. The control unit 10 generates correction data (image correction table) by inverting the two-dimensional luminance distribution data.

In a manner similar to steps 34 and 35, the control unit 10 generates correction data for reducing unevenness in luminance when displaying green on the liquid crystal panel 2 based on the result of detecting the positions of the images of the green alignment patterns 14*g* in step 23 and on the captured image of the green test patterns (step 36), and stores the correction data in the correction data storage unit 13 (step 37). The control unit 10 also generates correction data for reducing unevenness in luminance when displaying blue on the liquid crystal panel 2 based on the result of detecting the positions of the images of the blue alignment patterns 14*b* in step 24 and on the captured image of the blue test patterns (step 38), and stores the correction data in the correction data storage unit 13 (step 39).

The control unit 10 causes the ROM writer 9 to write the pieces of correction data used when displaying red, green and blue, which are stored in the correction data storage unit 13, into the ROM 5 (step 40). The liquid crystal panel 6 with image quality adjustment functions is completed by mounting the image quality adjustment circuit 4 including the ROM 5 on the liquid crystal panel 2 (step 41). When an image signal is input to this liquid crystal panel 6 with image quality adjustment functions (step 42), the image quality adjustment circuit 4 adds correction values to the input signal with reference to the pieces of correction data written into the ROM 5, thereby suppressing unevenness in the luminance of the liquid crystal panel 2 (step 43).

In the present embodiment, the red alignment patterns 14r displayed on the liquid crystal panel 2 are captured by the camera 3, and the black image displayed on the liquid crystal panel 2 is captured by the camera 3 using the focus, shutter speed and f-number that were used when capturing the red alignment patterns 14r. Based on a difference between the captured image of the red alignment patterns 14r and the captured image of the black image, the positions of the images of the red alignment patterns 14r on the imaging surface of the camera 3 are detected. That is to say, these positions are detected with high accuracy from a difference image from which noise (reference numeral 16 in FIG. 5) has been removed (an image obtained by subtracting the captured image of the black image from the captured image of the red alignment patterns 14r).

Similarly, the green alignment patterns 14g displayed on the liquid crystal panel 2 are captured by the camera 3, and the black image displayed on the liquid crystal panel 2 is captured by the camera 3 using the focus, shutter speed and f-number that were used when capturing the green alignment patterns 14g. Based on a difference between the captured image of the green alignment patterns 14g and the captured image of the black image, the positions of the images of the green alignment patterns 14g on the imaging surface of the camera 3 are detected. That is to say, these positions are detected with high accuracy from a difference image from which noise has been removed (an image obtained by subtracting the captured image of the black image from the captured image of the green alignment patterns 14g). Similarly, the blue alignment patterns 14b displayed on the liquid crystal panel 2 are captured by the camera 3, and the black image displayed on the liquid crystal panel 2 is captured by the camera 3 using the focus, shutter speed and f-number that were used when capturing the blue alignment patterns 14b. Based on a difference between the captured image of the blue alignment patterns 14b and the captured image of the black image, the positions of the images of the blue alignment patterns 14b on the imaging surface of the camera 3 are detected. That is to say, these positions are detected with high accuracy from a difference image from which noise has been removed (an image obtained by subtracting the captured image of the black image from the captured image of the blue alignment patterns 14b).

Based on the result of detecting the positions of the images of the red alignment patterns 14r and on the captured image of the red test patterns, correction data for reducing unevenness when displaying red on the liquid crystal panel 2 is generated. Based on the result of detecting the positions of the images of the green alignment patterns 14g and on the captured image of the green test patterns, correction data for reducing unevenness when displaying green on the liquid crystal panel 2 is generated. Based on the result of detecting the positions of the images of the blue alignment patterns 14b and on the captured image of the blue test patterns, correction data for reducing unevenness when displaying blue on the liquid crystal panel 2 is generated. As the positions of the images of the red alignment patterns 14r, green alignment patterns 14g and blue alignment patterns 14b are detected with high accuracy in the above manner, pieces of correction data used when displaying red, green and blue on the liquid crystal panel 2 can also be calculated with high accuracy.

Furthermore, as a signal input to the liquid crystal panel 2 is corrected based on these pieces of correction data, unevenness in display of the liquid crystal panel 2 can be reduced effectively, and the image quality thereof can be adjusted with high accuracy and thus be improved. In particular, even when the position of an image of a single pixel in the liquid crystal panel 2 significantly varies among displayed colors on the imaging surface of the camera 3 due to variations in the position of each RGB display element in the liquid crystal panel 2 or to the chromatic aberration of magnification of a lens in the camera 3, a signal input to the liquid crystal panel 2 can be corrected precisely for any color displayed in accordance with the pieces of correction data used when displaying red, green and blue. As a result, high image quality is achieved.

Embodiment 2

The present embodiment provides another method for generating correction data in the correction data generation system 1.

Figure 6:
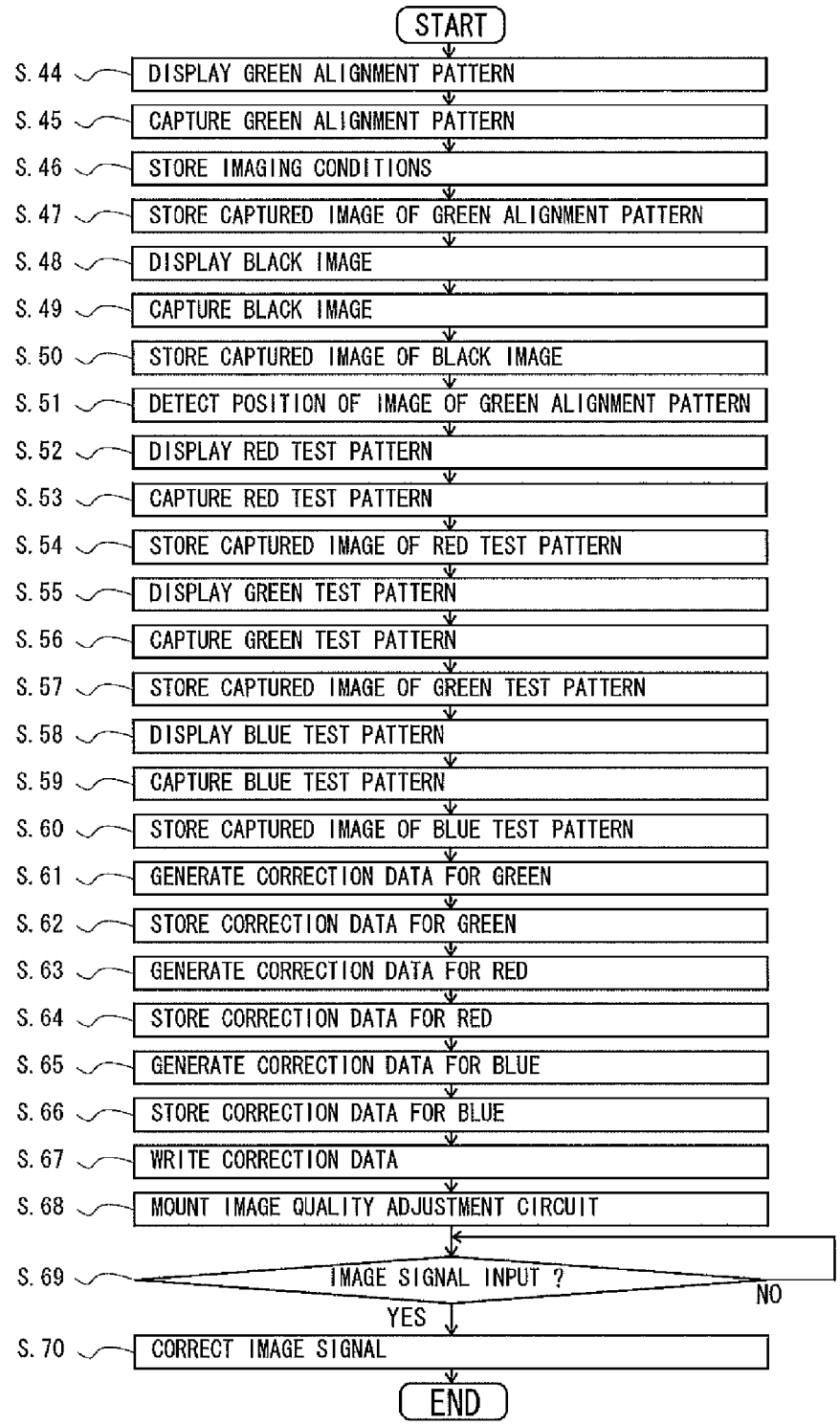
FIG. 6 is a flowchart of a pattern position detection method, a correction data generation method, a method for manufacturing a display panel with image quality adjustment functions, and an image quality adjustment method pertaining to Embodiment 2.

As illustrated in FIG. 6, the control unit 10 first instructs the test pattern generation apparatus 8 to transmit an alignment pattern display signal (G signal) to the liquid crystal panel 2 so as to display green alignment patterns 14g illustrated in FIG. 4B on the liquid crystal panel 2 (step 44). The control unit 10 captures the liquid crystal panel 2 displaying the green alignment patterns 14g with the camera 3 using an appropriate focus, shutter speed and f-number (step 45), stores these focus, shutter speed and f-number in the imaging condition storage unit 11 (step 46), and stores a captured image of the green alignment patterns 14g in the captured image storage unit 12 (step 47). Furthermore, the control unit 10 instructs the test pattern generation apparatus 8 to display a black image across the entire liquid crystal panel 2 (step 48), captures the displayed black image with the camera 3 using the focus, shutter speed and f-number stored in the imaging condition storage unit 11 (the focus, shutter speed and f-number that were used, in step 45) (step 49), and stores a captured image of the black image in the captured image storage unit 12 (step 50).

Next, the control unit 10 detects the positions of images of the green alignment patterns 14g on an imaging surface of the camera 3 based on a difference between the following images stored in the captured image storage unit 12: the captured image of the green alignment patterns 14g and the captured image of the black image, which were captured under the same conditions (step 51).

Subsequently, the control unit 10 instructs the test pattern generation apparatus 8 to transmit a test pattern display signal (R signal) to the liquid crystal panel 2 so as to display red test patterns on the liquid crystal panel 2 (step 52). The control unit 10 captures the liquid crystal panel 2 displaying the red test patterns with the camera 3 (step 53), and stores a captured image of the red test patterns in the captured image storage unit 12 (step 54).

In a manner similar to steps 52 to 54, the control unit 10 instructs the test pattern generation apparatus 8 to transmit a test pattern display signal (G signal) to the liquid crystal panel 2 so as to display green test patterns on the liquid crystal panel 2 (step 55). The control unit 10 captures the liquid crystal panel 2 displaying the green test patterns with the camera 3 (step 56), and stores a captured image of the green test patterns in the captured image storage unit 12 (step 57).

The control unit 10 also instructs the test pattern generation apparatus 8 to transmit a test pattern display signal (B signal) to the liquid crystal panel 2 so as to display blue test patterns on the liquid crystal panel 2 (step 58). The control unit 10 captures the liquid crystal panel 2 displaying the blue test patterns with the camera 3 (step 59), and stores a captured image of the blue test patterns in the captured image storage unit 12 (step 60).

Once the control unit 10 has captured the above test patterns, the control unit 10 generates correction data for reducing unevenness in luminance when displaying green on the liquid crystal panel 2 based on the result of detecting the positions of the images of the green alignment patterns 14g and on the captured image of the green test patterns (step 61), and stores the correction data in the correction data storage unit 13 (step 62).

The control unit 10 also generates correction data for reducing unevenness in luminance when displaying red on the liquid crystal panel 2 based on the result of detecting the positions of the images of the green alignment patterns 14g and on the captured image of the red test patterns (step 63), and stores the correction data in the correction data storage unit 13 (step 64).

More specifically, based on the result of detecting the positions of the images of the green alignment patterns 14g, the control unit 10 can estimate and calculate imaging elements in the camera 3 to which the aforementioned certain pixels in the liquid crystal panel 2 correspond when displaying red (as the chromatic aberration of magnification of a lens depends on the wavelength of light, as long as the positions of green images on the imaging surface of the camera 3 are known, the positions of images of other colors can be estimated). Therefore, with regard to other imaging elements that do not correspond to the aforementioned certain pixels, the control unit 10 can also calculate to which pixels or regions in the liquid crystal panel 2 these other imaging elements correspond through arithmetic operations such as interpolation. That is to say, the luminance of each pixel or region in the liquid crystal panel 2 is calculated based on the captured image of the red test patterns. This allows obtaining two-dimensional luminance distribution data for the case where the liquid crystal panel 2 displays red. The control unit 10 generates correction data by inverting the two-dimensional luminance distribution data.

Similarly, the control unit 10 generates correction data for reducing unevenness in luminance when displaying blue on the liquid crystal panel 2 based on the result of detecting the positions of the images of the green alignment patterns 14g and on the captured image of the blue test patterns (step 65), and stores the correction data in the correction data storage unit 13 (step 66).

The control unit 10 causes the ROM writer 9 to write the pieces of correction data used when displaying red, green and blue, which are stored in the correction data storage unit 13, into the ROM 5 (step 67). The liquid crystal panel 6 with image quality adjustment functions is completed by mounting the image quality adjustment circuit 4 including the ROM 5 on the liquid crystal panel 2 (step 68). When an image signal is input to this liquid crystal panel 6 with image quality adjustment functions (step 69), the image quality adjustment circuit 4 adds correction values to the input signal with reference to the pieces of correction data written into the ROM 5, thereby suppressing unevenness in the luminance of the liquid crystal panel 2 (step 70).

In the present embodiment, the green alignment patterns 14g displayed on the liquid crystal panel 2 are captured by the camera 3, and the black image displayed on the liquid crystal panel 2 is captured by the camera 3 using the focus, shutter speed and f-number that were used when capturing the green alignment patterns 14g. Based on a difference between the captured image of the green alignment patterns 14g and the captured image of the black image, the positions of the images of the green alignment patterns 14g on the imaging surface of the camera 3 are detected. That is to say, these positions are detected with high accuracy from a difference image from which noise has been removed (an image obtained by subtracting the captured image of the black image from the captured image of the green alignment patterns 14g).

Based on the result of detecting the positions of the images of the green alignment patterns 14g and on the captured image of the green test patterns, correction data for reducing unevenness when displaying green on the liquid crystal panel 2 is generated. As the positions of the images of the green alignment patterns 14g are detected with high accuracy in the above manner, correction data used when displaying green on the liquid crystal panel 2 can also be calculated with high accuracy.

Similarly, based on the result of detecting the positions of the images of the green alignment patterns 14g and on the captured images of the red test patterns and blue test patterns, pieces of correction data for reducing unevenness when displaying red and blue on the liquid crystal panel 2 are generated. As the positions of the images of the green alignment patterns 14g are detected with high accuracy in the above manner, the pieces of correction data used when displaying red and blue on the liquid crystal panel 2 can also be calculated with high accuracy.

Furthermore, as a signal input to the liquid crystal panel 2 is corrected based on these pieces of correction data, unevenness in display of the liquid crystal panel 2 can be reduced effectively, and the image quality thereof can be adjusted with high accuracy. In particular, even when the position of an image of a single pixel in the liquid crystal panel 2 significantly varies among displayed colors on the imaging surface of the camera 3 due to variations in the position of each RGB display element in the liquid crystal panel 2 or to the chromatic aberration of magnification of a lens in the camera 3, a signal input to the liquid crystal panel 2 can be corrected precisely for any color displayed in accordance with the pieces of correction data used when displaying red, green and blue. As a result, high image quality is achieved.

Moreover, in the present embodiment, the number of captured images of alignment patterns is smaller than in Embodiment 1, and therefore the takt time required to generate correction data can be reduced.

Embodiment 3

The present embodiment provides another method for generating correction data in the correction data generation system 1.

Figure 7:
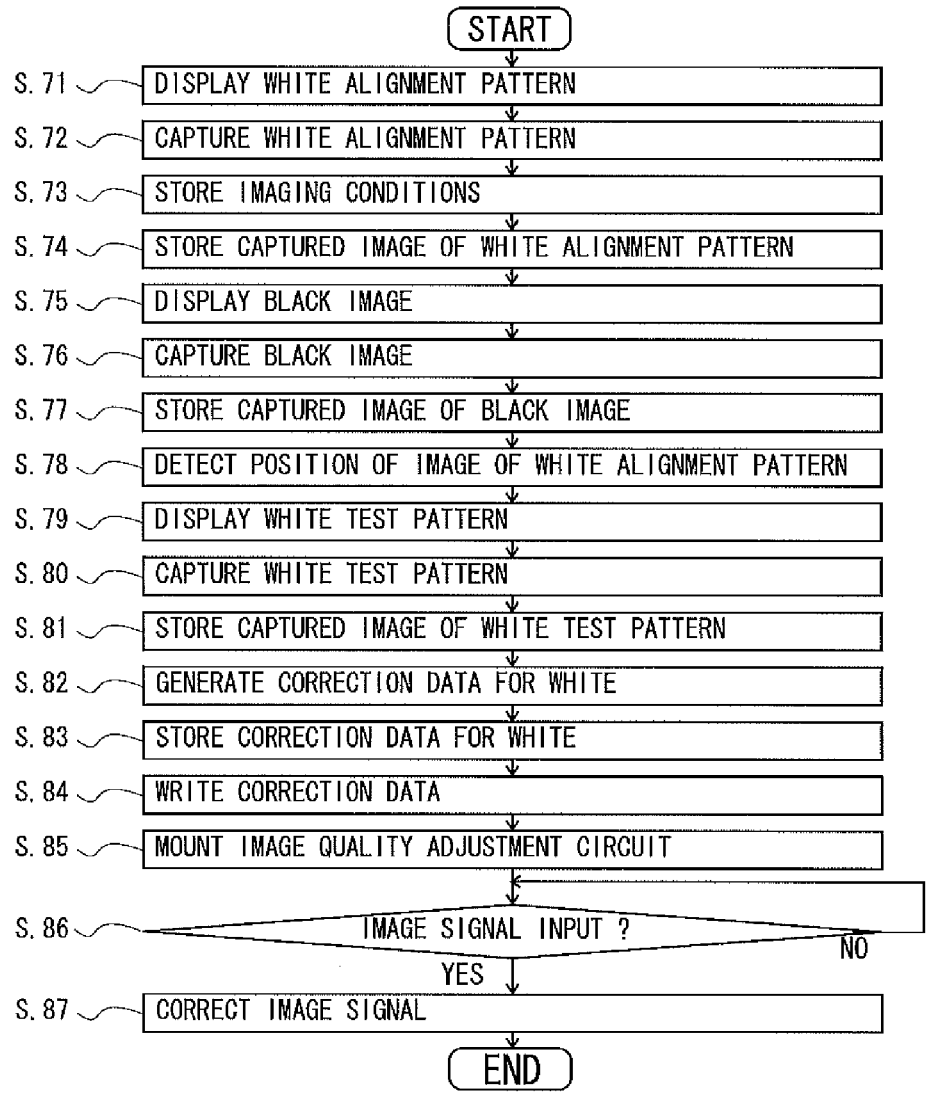
FIG. 7 is a flowchart of a pattern position detection method, a correction data generation method, a method for manufacturing a display panel with image quality adjustment functions, and an image quality adjustment method pertaining to Embodiment 3.

As illustrated in FIG. 7, the control unit 10 first instructs the test pattern generation apparatus 8 to transmit an alignment pattern display signal (RGB signal) to the liquid crystal panel 2 so as to display white (gray) alignment patterns 14w illustrated in FIG. 4D on the liquid crystal panel 2 (step 71). The control unit 10 captures the liquid crystal panel 2 displaying the white alignment patterns 14w with the camera 3 using an appropriate focus, shutter speed and f-number (step 72), stores these focus, shutter speed and f-number in the imaging condition storage unit 11 (step 73), and stores a captured image of the white alignment patterns 14w in the captured image storage unit 12 (step 74). Furthermore, the control unit 10 instructs the test pattern generation apparatus 8 to display a black image across the entire liquid crystal panel 2 (step 75), captures the displayed black image with the camera 3 using the focus, shutter speed and f-number stored in the imaging condition storage unit 11 (the focus, shutter speed and f-number that were used in step 72) (step 76), and stores a captured image of the black image in the captured image storage unit 12 (step 77).

Next, the control unit 10 detects the positions of images of the white alignment patterns 14w on an imaging surface of the camera 3 based on a difference between the following images stored in the captured image storage unit 12: the captured image of the white alignment patterns 14w and the captured image of the black image, which were captured under the same conditions (step 78).

Subsequently, the control unit 10 instructs the test pattern generation apparatus 8 to transmit a test pattern display signal (RGB signal) to the liquid crystal panel 2 so as to display white test patterns on the liquid crystal panel 2 (step 79). The control, unit 10 captures the liquid crystal panel 2 displaying the white test patterns with the camera 3 (step 80), and stores a captured image of the white test patterns in the captured image storage unit 12 (step 81).

Once the control unit 10 has captured the white test patterns, the control unit 10 generates correction data for reducing unevenness in luminance when displaying white on the liquid crystal panel 2 based on the result of detecting the positions of the images of the white alignment patterns 14w and on the captured image of the white test patterns (step 82), and stores the correction data in the correction data storage unit 13 (step 83).

The control unit 10 causes the ROM writer 9 to write the correction data used when displaying white, which is stored in the correction data storage unit 13, into the ROM 5 (step 84). The liquid crystal panel 6 with image quality adjustment functions is completed by mounting the image quality adjustment circuit 4 including the ROM 5 on the liquid crystal panel 2 (step 85). When an image signal is input to this liquid crystal panel 6 with image quality adjustment functions (step 86), the image quality adjustment circuit 4 adds correction values to the input signal with reference to the correction data written into the ROM 5, thereby suppressing unevenness in the luminance of the liquid crystal panel 2 (step 87).

In the present embodiment, the white alignment patterns 14w displayed on the liquid crystal panel 2 are captured by the camera 3, and the black image displayed on the liquid crystal panel 2 is captured by the camera 3 using the focus, shutter speed and f-number that were used when capturing the white alignment patterns 14w. Based on a difference between the captured image of the white alignment patterns 14w and the captured image of the black image, the positions of the images of the white alignment patterns 14w on the imaging surface of the camera 3 are detected. That is to say, these positions are detected with high accuracy from a difference image from which noise has been removed (an image obtained by subtracting the captured image of the black image from the captured image of the white alignment patterns 14w).

Based on the result of detecting the positions of the images of the white alignment patterns 14w and on the captured image of the white test patterns, correction data for reducing unevenness when displaying white on the liquid crystal panel 2 is generated. As the positions of the images of the white alignment patterns 14w are detected with high accuracy in the above manner, the correction data used when displaying white on the liquid crystal panel 2 can also be calculated with high accuracy.

Furthermore, as a signal input to the liquid crystal panel 2 is corrected based on this correction data, unevenness in display of the liquid crystal panel 2 can be reduced effectively, and the image quality thereof can be adjusted with high accuracy. In particular, when unevenness in color and unevenness with high-frequency components (unevenness with sudden changes) are not prominent on the liquid crystal panel 2, sufficient effects can be achieved, and the takt time required to generate correction data can be further reduced compared to Embodiment 2.

Although the above has described exemplary embodiments of the present invention, the present invention is not limited to the above embodiments and may be modified as appropriate without departing from the concept of the present invention.

For example, a display panel used in the adjustment of the image quality is not limited to a liquid crystal panel, and may instead be an organic EL panel, a plasma display panel (PDP), a projector, or the like.

The camera is not limited to a black-and-white camera, and may instead be a color camera. Also, the correction data is not limited to being generated based on a captured image of test patterns displayed using a single tone, and may instead be generated for each tone based on captured images of test patterns displayed using multiple tones. Furthermore, test patterns may not necessarily be displayed across the entire display panel as long as they show at least a part of unevenness in display of the display panel.

Moreover, although only the green alignment patterns are captured as alignment patterns in Embodiment 2, red or blue alignment patterns may be captured instead of the green alignment patterns (note, however, that it is preferable to capture the green alignment patterns because they are bright, have a high luminosity function, and exist between the red and blue alignment patterns in terms of wavelength).

Reference Signs List

1 CORRECTION DATA GENERATION SYSTEM
2 LIQUID CRYSTAL PANEL (DISPLAY PANEL)
3 CAMERA
4 IMAGE QUALITY ADJUSTMENT CIRCUIT
5 ROM (STORAGE UNIT)
6 LIQUID CRYSTAL PANEL (DISPLAY PANEL) WITH IMAGE QUALITY ADJUSTMENT FUNCTIONS
7 IMAGE QUALITY ADJUSTMENT APPARATUS
8 TEST PATTERN GENERATION APPARATUS
9 ROM WRITER
10 CONTROL UNIT
11 IMAGING CONDITION STORAGE UNIT
12 CAPTURED IMAGE STORAGE UNIT
13 CORRECTION DATA STORAGE UNIT
14r, 14g, 14b, 14w ALIGNMENT PATTERNS (PATTERNS)
15r, 15g, 15b, 15w DOTS
16 NOISE

The invention claimed is:

1. A pattern position detection method for capturing patterns displayed on a display panel with a camera and detecting positions of images of the patterns on an imaging surface of the camera, the method comprising:
  a red pattern imaging condition storing step of storing a first focus, a first shutter speed, and a first f-number for imaging red patterns;
  a red pattern capturing step of displaying red patterns at predetermined positions on the display panel and capturing the red patterns with the camera using the first focus, the first shutter speed, and the first f-number stored by the red pattern imaging condition storing step;
  a first black image capturing step of displaying a black image on the display panel and capturing the black image with the camera using the first focus, the first shutter speed, and the first f-number stored by the red pattern imaging condition storing step;

a green pattern imaging condition storing step of storing a second focus, a second shutter speed, and a second f-number for imaging green patterns;

a green pattern capturing step of displaying green patterns at predetermined positions on the display panel and capturing the green patterns with the camera using the second focus, the second shutter speed, and the second f-number stored by the green pattern imaging condition storing step;

a second black image capturing step of displaying a black image on the display panel and capturing the black image with the camera using the second focus, the second shutter speed, and the second f-number stored by the green pattern imaging condition storing step;

a blue pattern imaging condition storing step of storing a third focus, a third shutter speed, and a third f-number for imaging blue patterns;

a blue pattern capturing step of displaying blue patterns at predetermined positions on the display panel and capturing the blue patterns with the camera using the third focus, the third shutter speed, and the third f-number stored by the blue pattern imaging condition storing step;

a third black image capturing step of displaying a black image on the display panel and capturing the black image with the camera using the third focus, the third shutter speed, and the third f-number stored by the blue pattern imaging condition storing step;

a red pattern position detecting step of detecting positiFons of images of the red patterns on the imaging surface based on a difference between an image captured in the red pattern capturing step and an image captured in the first black image capturing step;

a green pattern position detecting step of detecting positions of images of the green patterns on the imaging surface based on a difference between an image captured in the green pattern capturing step and an image captured in the second black image capturing step; and a blue pattern position detecting step of detecting positions of images of the blue patterns on the imaging surface based on a difference between an image captured in the blue pattern capturing step and an image captured in the third black image capturing step.

2. A correction data generation method for generating correction data by utilizing the pattern position detection method according to claim 1, the correction data being for reducing unevenness in display of the display panel by correcting a signal input to the display panel, the correction data generation method further comprising:

a red image capturing step of displaying a red image on the display panel and capturing the red image with the camera;

a green image capturing step of displaying a green image on the display panel and capturing the green image with the camera;

a blue image capturing step of displaying a blue image on the display panel and capturing the blue image with the camera;

a red correction data generating step of generating correction data for reducing unevenness when displaying red on the display panel based on a result of detection in the red pattern position detecting step and on an image captured in the red image capturing step;

a green correction data generating step of generating correction data for reducing unevenness when displaying green on the display panel based on a result of detection in the green pattern position detecting step and on an image captured in the green image capturing step; and a blue correction data generating step of generating correction data for reducing unevenness when displaying blue on the display panel based on a result of detection in the blue pattern position detecting step and on an image captured in the blue image capturing step.

3. An image quality adjustment method for adjusting image quality of a display panel using correction data for reducing unevenness in display of the display panel by utilizing the pattern position detection method according to claim 1, the image quality adjustment method further comprising:

a red image capturing step of displaying a red image on the display panel and capturing the red image with the camera;

a green image capturing step of displaying a green image on the display panel and capturing the green image with the camera;

a blue image capturing step of displaying a blue image on the display panel and capturing the blue image with the camera;

a red correction data generating step of generating correction data for reducing unevenness when displaying red on the display panel based on a result of detection in the red pattern position detecting step and on an image captured in the red image capturing step;

a green correction data generating step of generating correction data for reducing unevenness when displaying green on the display panel based on a result of detection in the green pattern position detecting step and on an image captured in the green image capturing step;

a blue correction data generating step of generating correction data for reducing unevenness when displaying blue on the display panel based on a result of detection in the blue pattern position detecting step and on an image captured in the blue image capturing step; and an input signal correcting step of correcting the signal input to the display panel based on the pieces of correction data generated in the red correction data generating step, the green correction data generating step and the blue correction data generating step.

4. A pattern position detection system for capturing patterns displayed on a display panel with a camera and detecting positions of images of the patterns on an imaging surface of the camera, the system comprising:

a display control means that displays red patterns, green patterns and blue patterns at predetermined positions on the display panel, and a black image on the display panel;

a red pattern position detection means that detects positions of images of the red patterns on the imaging surface based on a difference between an image obtained by the camera using a first focus, a first shutter speed, and a first f-number, capturing the red patterns displayed by the display control means on the display panel, and an image obtained by the camera capturing the black image displayed by the display control means on the display panel using the first focus, the first shutter speed, and the first f-number used when capturing the red patterns;

a green pattern position detection means that detects positions of images of the green patterns on the imaging surface based on a difference between an image obtained by the camera using a second focus, a second shutter speed, and a second f-number, capturing the green patterns displayed by the display control means on the display panel, and an image obtained by the camera capturing the black image displayed by the display control means on the display panel using the second focus, the second shutter speed, and the second f-number used when capturing the green patterns; and a blue pattern position detection means that detects positions of images of the blue patterns on the imaging surface based on a difference between an image obtained by the camera using a third focus, a third shutter speed, and a third f-number, capturing the blue patterns displayed by the display control means on the display panel, and an image obtained by the camera capturing the black image displayed by the display control means on the display panel using the third focus, the third shutter speed, and the third f-number used when capturing the blue patterns.

5. A correction data generation system for generating correction data comprising the pattern position detection system according to claim 4, the correction data being for reducing unevenness in display of the display panel by correcting a signal input to the display panel, the correction data generation system further comprising:

a red correction data generation means that generates correction data for reducing unevenness when displaying red on the display panel based on a result of detection by the red pattern position detection means and on an image obtained by the camera capturing the red image displayed by the display control means on the display panel;

a green correction data generation means that generates correction data for reducing unevenness when displaying green on the display panel based on a result of detection by the green pattern position detection means and on an image obtained by the camera capturing the green image displayed by the display control means on the display panel; and a blue correction data generation means that generates correction data for reducing unevenness when displaying blue on the display panel based on a result of detection by the blue pattern position detection means and on an image obtained by the camera capturing the blue image displayed by the display control means on the display panel wherein the display control means further displays a red image, a green image and a blue image on the display panel.

6. A method for manufacturing a display panel with image quality adjustment functions including a display panel and an image quality adjustment means provided with a storage having stored therein correction data for reducing unevenness in display of the display panel by utilizing the pattern position detection method according to claim 1, the method further comprising:

a red image capturing step of displaying a red image on the display panel and capturing the red image with the camera;

a green image capturing step of displaying a green image on the display panel and capturing the green image with the camera;

a blue image capturing step of displaying a blue image on the display panel and capturing the blue image with the camera;

a red correction data generating step of generating correction data for reducing unevenness when displaying red on the display panel based on a result of detection in the red pattern position detecting step and on an image captured in the red image capturing step;

a green correction data generating step of generating correction data for reducing unevenness when displaying green on the display panel based on a result of detection in the green pattern position detecting step and on an image captured in the green image capturing step;

a blue correction data generating step of generating correction data for reducing unevenness when displaying blue on the display panel based on a result of detection in the blue pattern position detecting step and on an image captured in the blue image capturing step;

a correction data storing step of storing the pieces of correction data generated in the red correction data generating step, the green correction data generating step and the blue correction data generating step in the storage; and a mounting step of mounting the image quality adjustment means on the display panel so that the image quality adjustment means corrects the signal input to the display panel based on the pieces of correction data.

7. A display panel with image quality adjustment functions including a display panel and an image quality adjustment means provided with a storage having stored therein correction data for reducing unevenness in display of the display panel by correcting a signal input to the display panel, wherein red patterns are displayed at predetermined positions on the display panel and captured by a camera using a first focus, a first shutter speed, and a first f-number, a black image is displayed on the display panel and captured by the camera using the first focus, the first shutter speed, and the first f-number, positions of images of the red patterns on an imaging surface of the camera are detected based on a difference between a captured image of the red patterns and a captured image of the black image, and a red image is displayed on the display panel and captured by the camera, green patterns are displayed at predetermined positions on the display panel and captured by the camera using a second focus, a second shutter speed, and a second f-number, a black image is displayed on the display panel and captured by the camera using the second focus, the second shutter speed, and the second f-number used when capturing the green patterns, positions of images of the green patterns on the imaging surface are detected based on a difference between a captured image of the green patterns and a captured image of the black image, and a green image is displayed on the display panel and captured by the camera, blue patterns are displayed at predetermined positions on the display panel and captured by the camera using a third focus, a third shutter speed, and a third f-number, a black image is displayed on the display panel and captured by the camera using the third focus, the third shutter speed, the third f-number used when capturing the blue patterns, positions of images of the blue patterns on the imaging surface are detected based on a difference between a captured image of the blue patterns and a captured image of the black image, and a blue image is displayed on the display panel and captured by the camera, and the storage stores therein correction data for reducing unevenness when displaying red on the display panel, the correction data being generated based on a result of detecting the positions of the images of the red patterns and on a captured image of the red image, correction data for reducing unevenness when displaying green on the display panel, the correction data being generated based on a result of detecting the positions of the images of the green patterns and on a captured image of the green image, and correction data for reducing unevenness when displaying blue on the display panel, the correction data being generated based on a result of detecting the positions of the images of the blue patterns and on a captured image of the blue image.

\* \* \* \* \*